United States Patent
Kumar et al.

(10) Patent No.: US 11,366,564 B2
(45) Date of Patent: Jun. 21, 2022

(54) ELECTRONIC DEVICE AND METHOD FOR MULTI-VIEW BROWSING IN AN AUGMENTED REALITY ENVIRONMENT

(71) Applicant: Samsung Electronics Co., Ltd., Suwon-si (KR)

(72) Inventors: Avinash Kumar, Noida (IN); Ritesh Kumar Ojha, Noida (IN); Gitanshu Mehndiratta, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/817,991

(22) Filed: Mar. 13, 2020

(65) Prior Publication Data

US 2020/0293178 A1    Sep. 17, 2020

(30) Foreign Application Priority Data

Mar. 13, 2019   (IN) .............................. 201911009793

(51) Int. Cl.
| | |
|---|---|
| *G06F 3/04815* | (2022.01) |
| *G06F 16/954* | (2019.01) |
| *G06F 3/01* | (2006.01) |
| *G06T 19/00* | (2011.01) |
| *G06F 16/955* | (2019.01) |

(52) U.S. Cl.
CPC .......... *G06F 3/04815* (2013.01); *G06F 3/013* (2013.01); *G06F 16/954* (2019.01); *G06F 16/955* (2019.01); *G06T 19/006* (2013.01)

(58) Field of Classification Search
CPC .................................................. G06F 3/04815
See application file for complete search history.

(56) References Cited

U.S. PATENT DOCUMENTS

| | | |
|---|---|---|
| 7,200,804 B1 | 4/2007 | Khavari et al. |
| 2013/0135344 A1 | 5/2013 | Stirbu et al. |
| 2013/0278777 A1 | 10/2013 | Sweet, III et al. |
| 2017/0131964 A1* | 5/2017 | Baek ..................... G06T 19/006 |
| 2018/0095616 A1* | 4/2018 | Valdivia .................. G06F 3/013 |
| 2019/0146219 A1* | 5/2019 | Rodriguez, II ....... G06F 3/0482 345/633 |
| 2019/0243445 A1* | 8/2019 | Kuwatani ............... A63F 13/87 |
| 2019/0340816 A1* | 11/2019 | Rogers ................... H04L 67/22 |

FOREIGN PATENT DOCUMENTS

| | | |
|---|---|---|
| CN | 107085868 A | 8/2017 |
| KR | 10-2017-0089662 A | 8/2017 |

\* cited by examiner

*Primary Examiner* — Roland J Casillas
(74) *Attorney, Agent, or Firm* — Jefferson IP Law, LLP

(57) ABSTRACT

A method and an electronic device providing multi-views with an augmented reality (AR) device are provided. The method includes establishing a connection with at least one browsing device, receiving content source information from the at least one browsing device, transmitting the content source information to a second server to fetch AR content from the second server, and displaying, based on the content source information, the AR content on an AR plane which is separately viewable from a webpage displayed on a display of the at least one browsing device.

20 Claims, 41 Drawing Sheets

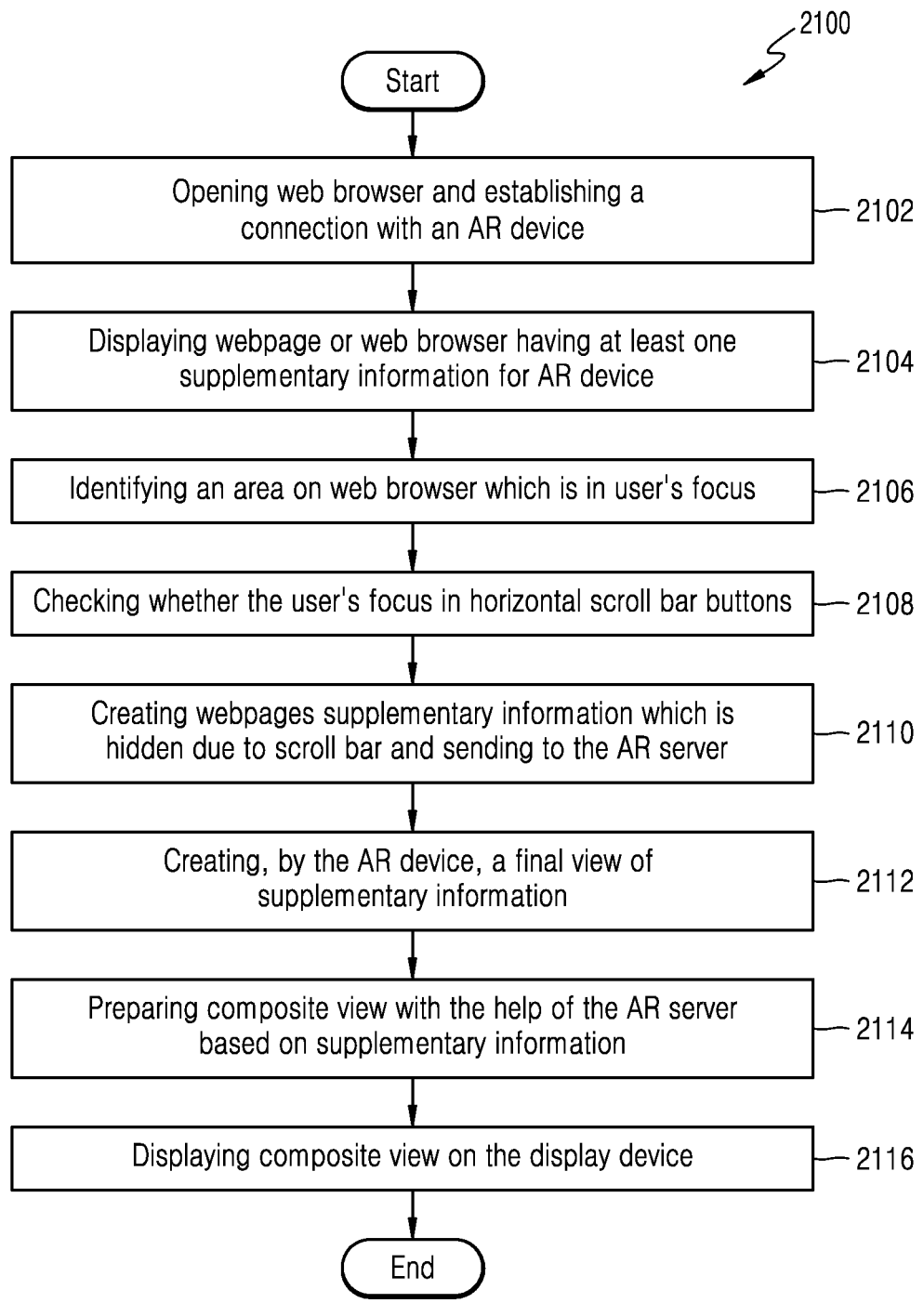

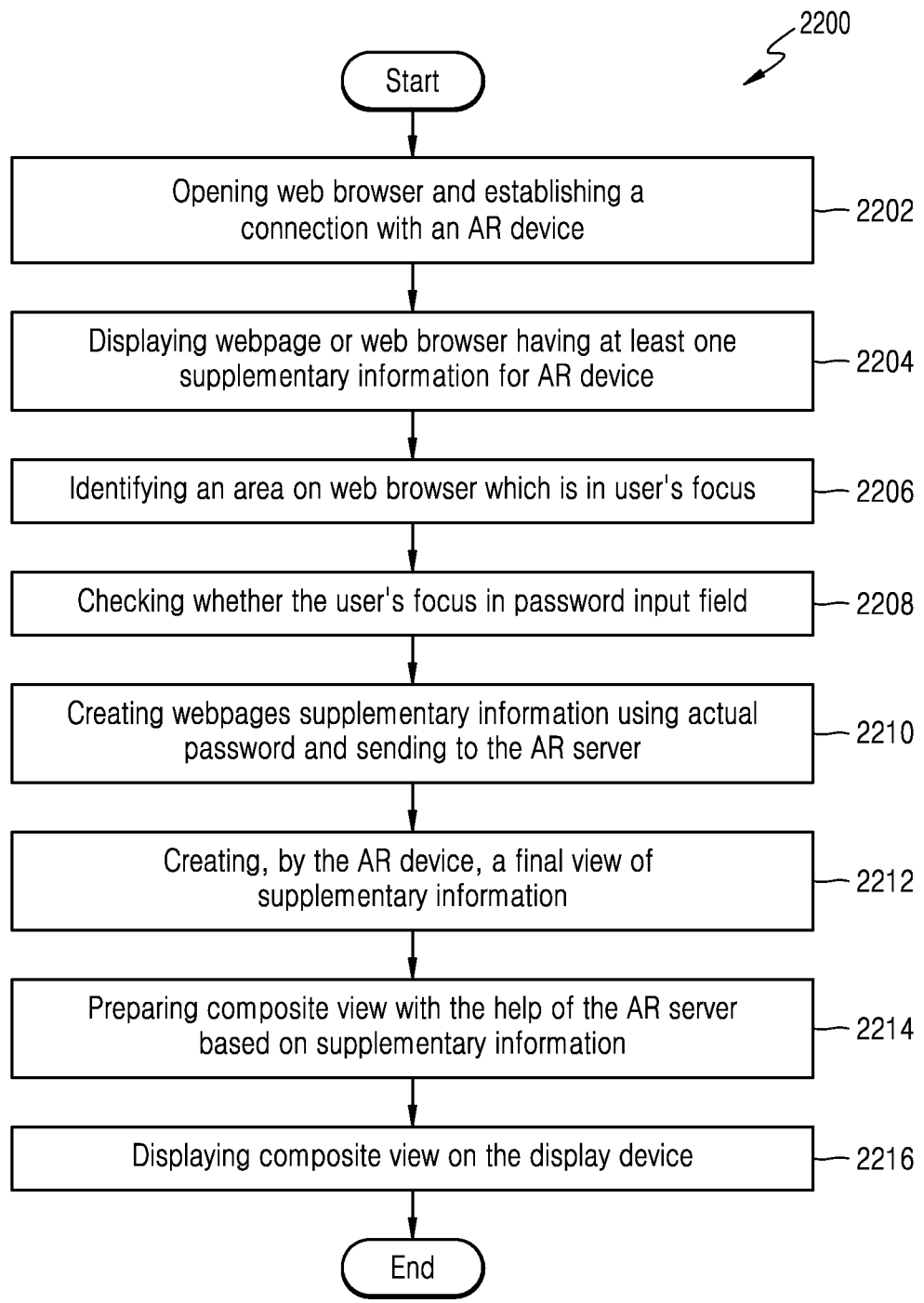

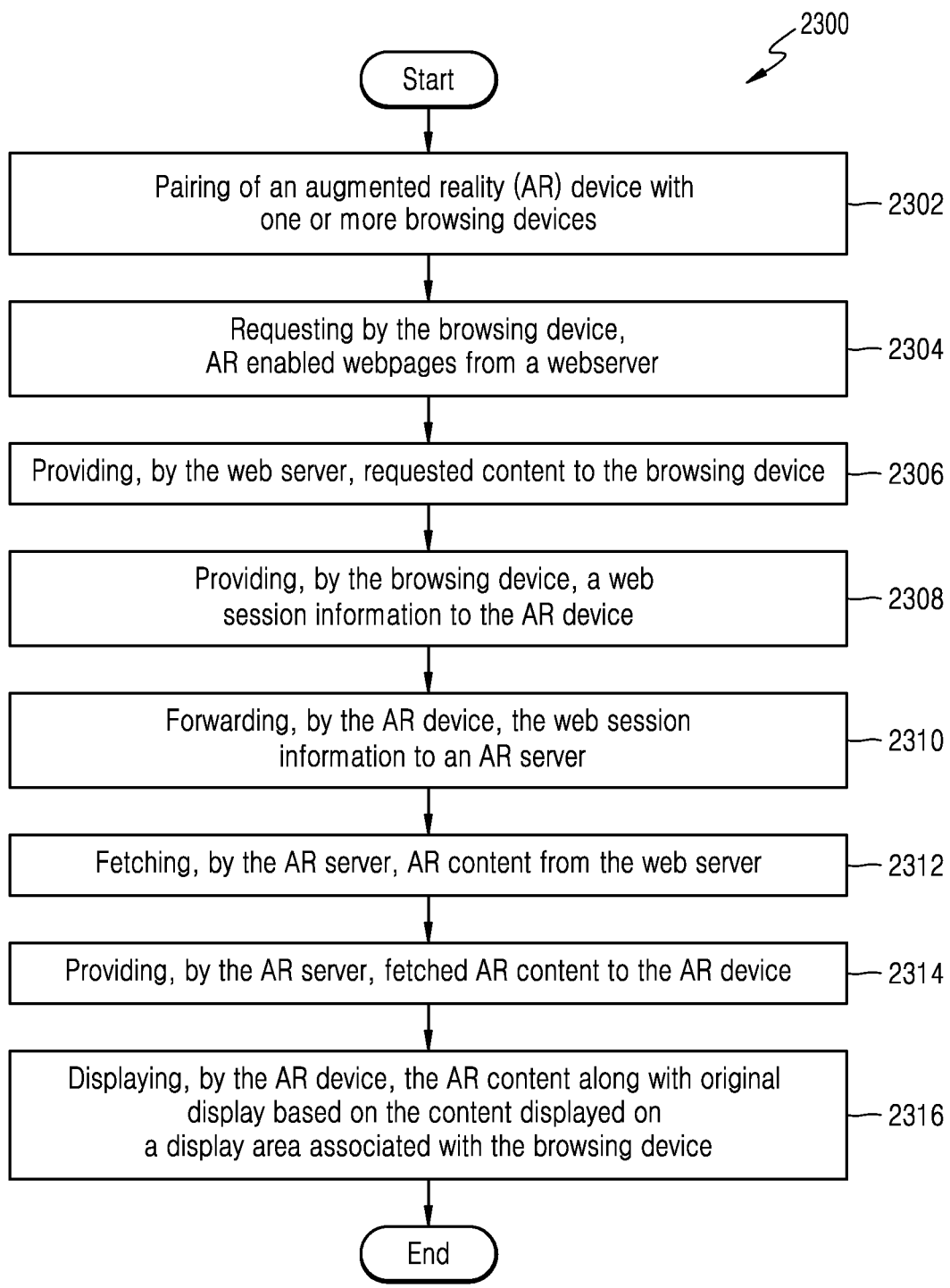

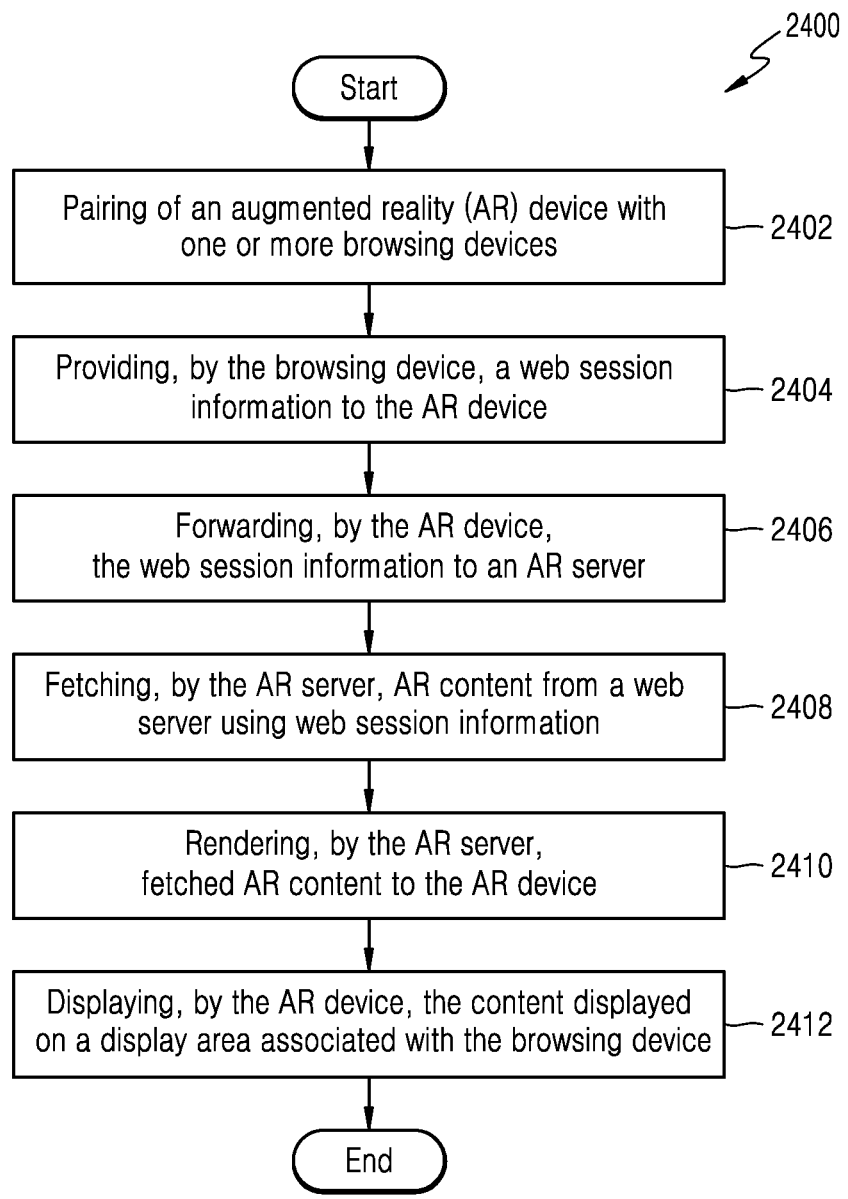

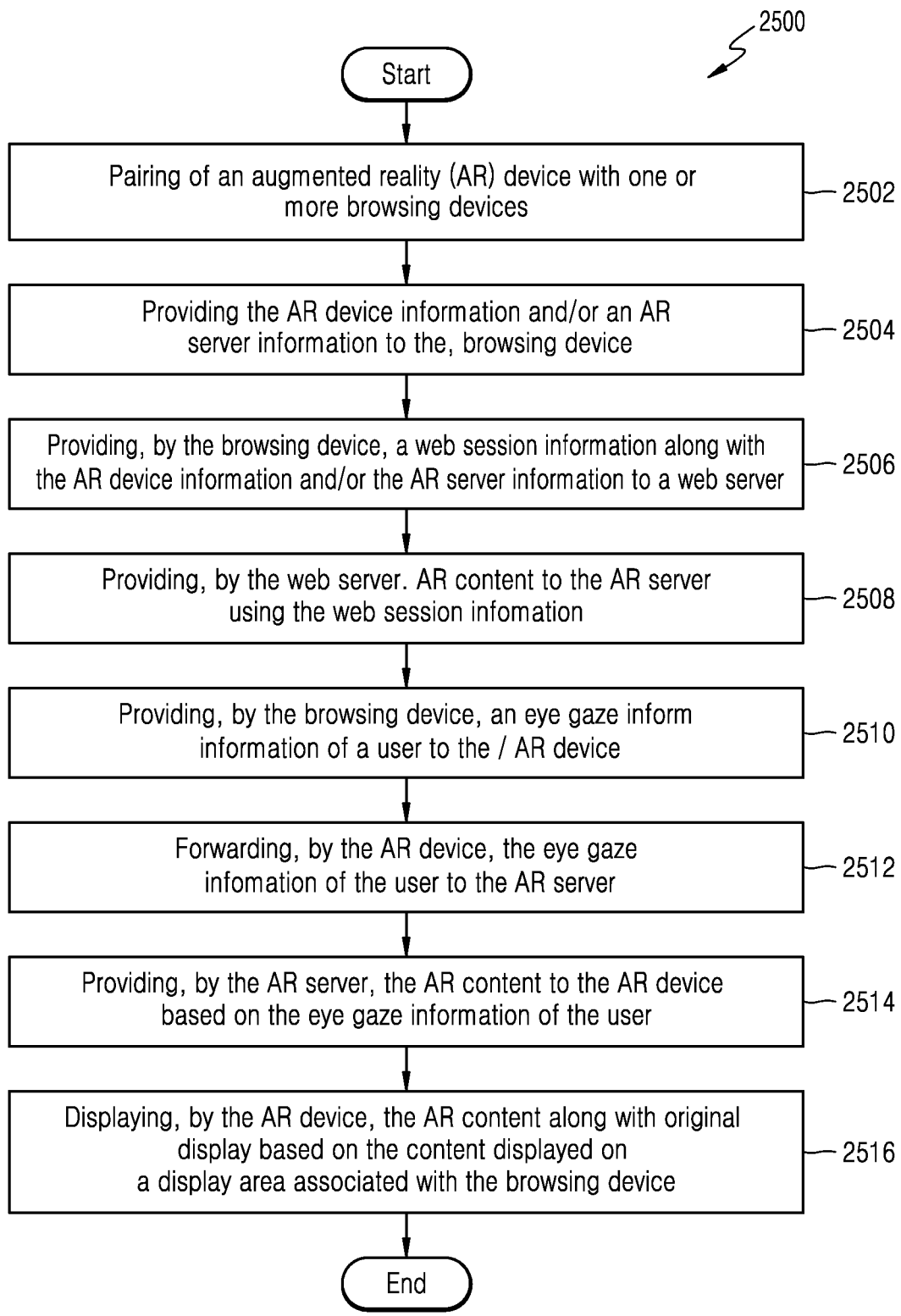

ELECTRONIC DEVICE AND METHOD FOR MULTI-VIEW BROWSING IN AN AUGMENTED REALITY ENVIRONMENT

CROSS-REFERENCE TO RELATED APPLICATION(S)

This application is based on and claims priority under 35 U.S.C. § 119(a) of an Indian Complete patent application number 201911009793, filed on Mar. 13, 2019, in the Indian Intellectual Property Office, the disclosure of which is incorporated by reference herein in its entirety.

BACKGROUND

1. Field

The disclosure relates to content browsing. More particularly, the disclosure relates to devices and methods for providing multi-view browsing experience in an augmented reality (AR) environment.

2. Description of Related Art

Augmented Reality (AR) is an integration of digital information with the user's environment in real-time. Unlike virtual reality (VR) which creates an artificial environment, the AR uses the existing environment and overlays new additional and useful information on the existing environment. The AR supports real-time augmentation of content by detecting user's field of view and using technologies such as scene and object detection. Mostly, the AR usage is related to real world data or requires a physical environment on which it is building its own digital information. As the technologies are moving from the physical environment to digital environment, i.e. Web Domain, the AR has started to come to the web environment.

However, the major problem with the existing AR devices in web is that the web always displays AR supplementary information in the web view area or displays AR supplementary information in a field view of camera associated with a displaying device. In both cases, an actual webpage/web content is distorted or overlapped" which means loss of actual information, while displaying supplementary information. Web is flooded with a large amount of information, but due to limitation of displaying device screen size, supplementary information overlaps the main information. It creates a very unwanted user experience, which results in losses of user's interest in an augmented environment.

CN107085868 is related to an image rendering method by obtaining a uniform resource locator (URL) to enhance reality by the web browser. In CN107085868, the efficiency of a terminal enhanced that consumes relatively long time to download an application and is low in AR efficiency. It modifies the existing webpage to align the AR technology. It has limitation that original content of the webpage is not visible to the user. The user will see the object is imposed on the webpage and only composite view is visible to user. However, this method does not mention about enhancing the user experience by showing supplementary information to the user along with the original webpage.

US20130135344A1 discloses an approach for generating web-based augmented reality application viewer. However, it has a limitation of fixed screen size, which is causing less effective user experience. AR object has been drafted to the webpage, which has initiated AR request. These AR object overlap the actual webpage content, therefore loss of information. However, this prior art does not mention about enhancing the user experience by showing supplementary information about an object in a composite view.

US20130278777A1 discloses displaying a webpage on a display associated with a portable device; passively detecting a first object within a field of view of a camera associated with the portable device; and altering at least part of the web page with first content associated with the first object in response to passively detecting the first object within the field of view of the camera. However, it has limitation of dependency on the camera associated with the displaying device. This prior art also does not mention about enhancing the user experience by showing supplementary information about an object in a composite view.

Therefore, there is a need of a system and method that limits the aforementioned drawbacks and provides multi-view browsing experience to the user in an augmented reality environment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for multi-view browsing experience in an augmented reality environment. This summary is neither intended to identify essential features of the disclosure nor is it intended for use in determining or limiting the scope of the disclosure.

Another aspect of the disclosure is to provide one or more platforms and methods for providing multi-view browsing experience in an augmented reality environment.

Additional aspects will be set forth in part in the description which follows and, in part, will be apparent from the description, or may be learned by practice of the presented embodiments.

In accordance with an aspect of the disclosure, a method of providing multi-views with an augmented reality (AR) device is provided. The method includes establishing a connection with at least one browsing device, receiving content source information from the at least one browsing device, transmitting the content source information to a second server to fetch AR content from the second server, and displaying, based on the content source information, the AR content on an AR plane which is separately viewable from a webpage displayed on a display of the at least one browsing device.

In accordance with another aspect of the disclosure, an electronic device for providing multi-views in an AR environment is provided. The electronic device is an AR device which includes a camera, and at least one processor configured to establish a connection with at least one browsing device, receive content source information from the at least one browsing device, and transmit the content source information to a second server to fetch AR content from the second server, wherein the display is configured to display, based on the content source information, the AR content on an AR plane which is separately viewable from a webpage displayed on a display of the at least one browsing device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will become more apparent from the following description taken in conjunction with the accompanying drawings, in which:

FIG. 21 illustrates a flowchart 2100 of displaying a web browser with a scroll free webpage mode, according to an embodiment of the disclosure;

FIG. 22 illustrates a flowchart 2200 if displaying a webpage password as supplementary information, according to an embodiment of the disclosure;

FIG. 23 illustrates a flowchart 2300 of providing multi-view browsing experience in an augmented reality environment, according to an embodiment of the disclosure;

FIG. 24 illustrates a flowchart 2400 of providing multi-view browsing experience in an augmented reality environment, according to an embodiment of the disclosure;

FIG. 25 illustrates a flowchart 2500 of providing multi-view browsing experience in an augmented reality environment, according to an embodiment of the disclosure;

Figure 1:
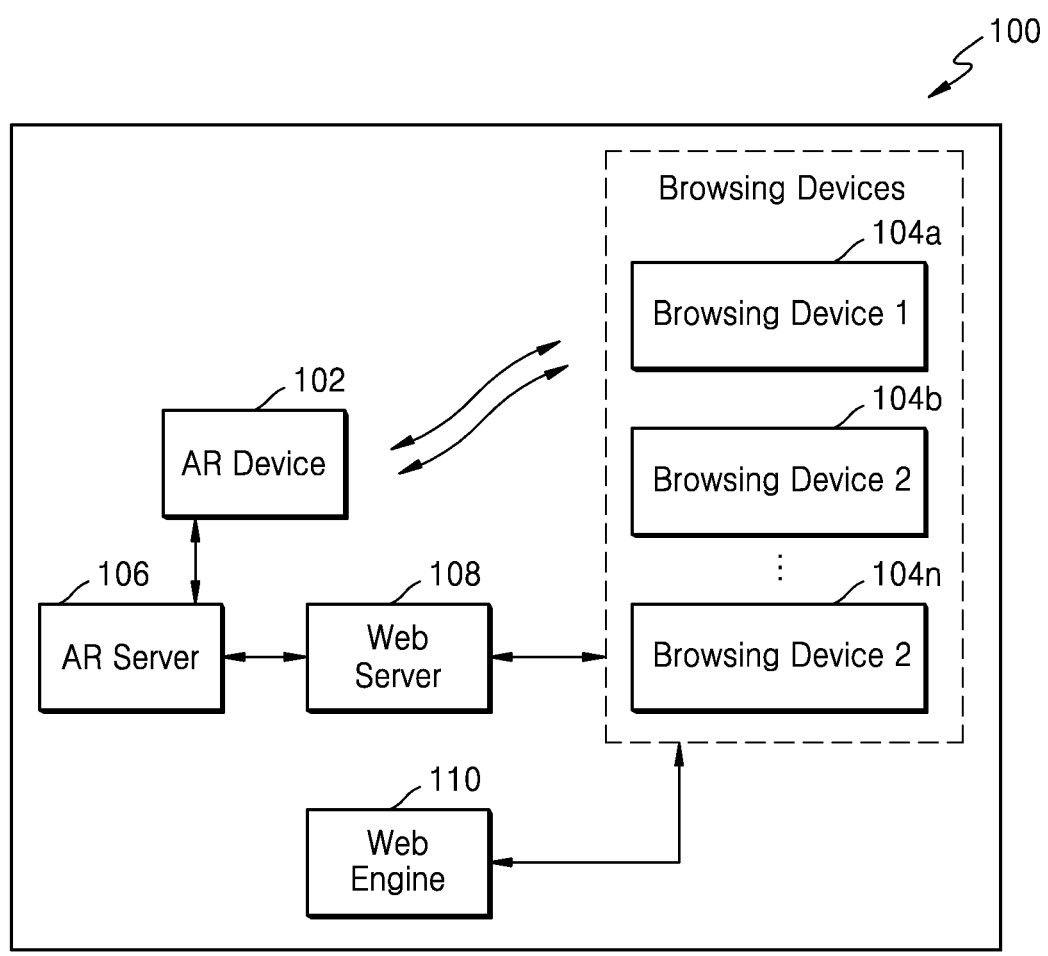
FIG. 1 is a block diagram illustrating a computer implemented system for providing multi-view browsing in an augmented reality environment, according to an embodiment of the disclosure.

It should be appreciated by those skilled in the art that any block diagrams herein represent conceptual views of illustrative systems embodying the principles of the disclosure. Similarly, it will be appreciated that any flowcharts, flow diagrams, and the like represent various processes which may be substantially represented in computer readable medium and so executed by a computer or processor, whether or not such computer or processor is explicitly shown.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments of the disclosure will be described below in detail with reference to the accompanying drawings.

In one of the embodiments, a computer implemented method for providing multi-view browsing experience in an augmented reality environment, includes a step of pairing of an augmented reality (AR) device with one or more browsing devices. The method includes a step of requesting, by the browsing device, AR enabled webpages from a web server. The method includes a step of providing, by the web server, requested content to the browsing device. The method includes a step of providing, by the browsing device, a web session information to the AR device. The method includes a step of forwarding, by the AR device, the web session information to an AR server. The method includes a step of fetching, by the AR server, AR content from the web server. The method includes a step of providing, by the AR server, fetched AR content to the AR device. The method includes a step of displaying, by the AR device, the AR content along with original display based on the content displayed on a display area associated with the browsing device.

In another implementation, the method further includes a step of providing, by the browsing device, eye gaze information to the AR device. The method includes a step of forwarding, by the AR device, the eye gaze information to the AR server. The method includes a step of providing, by the AR server, AR content to the AR device based on an eye gaze information of a user In another implementation, the method further includes a step of creating at least one supplementary AR field of view based on the web session information.

In another implementation, the method further includes a step of determining placement and position of the AR field of view based on the web session and the eye gaze information of the user.

In another implementation, the web session information includes AR metadata, the eye gaze information of the user, and field of view of the webpage.

In another implementation, the eye gaze information includes position information, field of view information and gaze information.

In another implementation, the eye gaze information is calculated based on tracking of eye gaze and finding coordinates of eye gaze on the display area associated with the browsing device having web browsing application.

In another implementation, the eye gaze information calculation is based on AR device's camera calculation of user focus point coordinates with respect to AR view and browsing device's camera calculation of user focus point coordinates with respect to the display area associated with the browsing device.

In another implementation, the eye gaze information calculation is based on AR device's camera calculation of user focus point coordinates with respect to AR view and user focus element on document object model (DOM) tree.

In another implementation, the step of pairing of an augmented reality (AR) device with the browsing device includes fetching, by the AR device, an URL opened on the browsing device. The steps include fetching, by the AR device, a title of the URL from the web server, and comparing, by the AR device, the title of the URL opened on the browsing device with the fetched title of the URL from the web server.

In another implementation, if the step of comparing fails, the AR device disconnect the pairing of the AR device with the browsing device.

In another implementation, the fetched AR content of whole page as well as selective filtered content based on the eye gaze information rendered on a display device associated with the AR device.

In another embodiment, a computer implemented method for providing multi-view browsing experience in an augmented reality environment, includes a step of pairing of an augmented reality (AR) device with one or more browsing devices. The method includes a step of providing, by the browsing device, web session information to the AR device. The method includes a step of forwarding, by the AR device, the web session information to an AR server. The method includes a step of fetching, by the AR server, AR content from a web server using web session information. The method includes a step of rendering, by the AR server, fetched AR content to the AR device. The method includes a step of displaying, by the AR device, the content displayed on a display area associated with the browsing device.

In another implementation, the method includes a step of providing, by the browsing device, eye gaze information to the AR device. The method includes a step of forwarding, by the AR device, the eye gaze information to the AR server. Further, the method includes a step of providing, by the AR server, AR content to the AR device based on an eye gaze information of a user.

In another implementation, the method includes a step of creating at least one supplementary AR field of view based on the web session information.

In another implementation, the method includes a step of determining placement and position of the AR field of view based on the web session and the eye gaze information of the user.

In another implementation, the web session information includes content source information (URL), the eye gaze information of the user, and/or field of view of the webpage.

In another implementation, the eye gaze information includes position information, field of view information and gaze information.

In another implementation, the eye gaze information is calculated based on tracking of eye gaze and finding coordinates of eye gaze on the display area associated with the browsing device having web browsing application.

In another implementation, the eye gaze information calculation is based on AR device's camera calculation of user focus point coordinates with respect to AR view and browsing device's camera calculation of user focus point coordinates with respect to the display area associated with the browsing device.

In another implementation, the eye gaze information calculation is based on AR device's camera calculation of user focus point coordinates with respect to AR view and user focus element on document object model (DOM) tree.

In another implementation, the step of pairing of an augmented reality (AR) device with the browsing device includes a step of fetching, by the AR device, an URL opened on the browsing device. The step includes fetching, by the AR device, a title of the URL from the web server. The step includes comparing, by the AR device, the title of the URL opened on the browsing device with the fetched title of the URL from the web server.

In another implementation, if the step of comparing fails, the AR device disconnect the pairing of the AR device with the browsing device.

In another implementation, the fetched AR content of whole page as well as selective filtered content based on the eye gaze information rendered on the display device associated with the AR device.

In another embodiment, a computer implemented method for providing multi-view browsing experience in an augmented reality environment, includes a step of pairing of an augmented reality (AR) device with one or more browsing devices. The method includes a step of providing the AR device information and/or an AR server information to the browsing device. The method includes a step of providing, by the browsing device, a web session information along with the AR device information and/or the AR server information to a web server. The method includes a step of providing, by the web server, AR content to the AR server using the web session information. The method includes a step of providing, by the browsing device, an eye gaze information of a user to the AR device. The method includes a step of forwarding, by the AR device, the eye gaze information of the user to the AR server. The method includes a step of providing, by the AR server, the AR content to the AR device based on the eye gaze information of the user. The method includes a step of displaying, by the AR device, AR content along with original display based on the content displayed on a display area associated with the browsing device.

In another implementation, the method includes a step of creating at least one supplementary AR field of view based on the web session information.

In another implementation, the method includes a step of determining placement and position of the AR field of view based on the web session and the eye gaze information.

In another implementation, the web session information includes content source information (URL), and/or field of view of the webpage.

In another implementation, the eye gaze information includes position information, field of view information and gaze information.

In another implementation, the eye gaze information is calculated based on tracking of eye gaze and finding coordinates of eye gaze on the display area associated with the browsing device having web browsing application.

In another implementation, the eye gaze information calculation is based on AR device's camera calculation of user focus point coordinates with respect to AR view and browsing device's camera calculation of user focus point coordinates with respect to the display area associated with the browsing device.

In another implementation, the eye gaze information calculation is based on AR device's camera calculation of user focus point coordinates with respect to AR view and user focus element on document object model (DOM) tree.

In another implementation, the step of pairing of an augmented reality (AR) device with said browsing device includes fetching, by the AR device, an URL opened on the browsing device; fetching, by the AR device, a title of the URL from the web server; and comparing, by the AR device, the title of the URL opened on the browsing device with the fetched title of the URL from the web server.

In another implementation, if the step of comparing fails, the AR device disconnect the pairing of the AR device with the browsing device.

In another implementation, the fetched AR content of whole page as well as selective filtered content based on the eye gaze information rendered on the display device associated with the AR device.

In another embodiment, a computer implemented system for providing multi-view browsing experience in an augmented reality environment, includes a memory configured to store pre-defined rules. A processor is configured to generate system processing commands based on the pre-defined rules. Further, the processor is configured to establish connection between an augmented reality (AR) device and one or more browsing devices. The browsing device is configured to request AR enabled webpages from a web server. The web server is configured to provide the requested content to the browsing device. The browsing device is configured to provide a web session information to the AR device. The AR device is configured to forward the web session information to an AR server. The AR server is configured to fetch AR content from the web server, and provide the fetched AR content to the AR device. The AR device is configured to display the AR content along with original display based on the content displayed on a display area associated with said browsing device.

In another implementation, the browsing device is configured to cooperate with an eye gaze tracking module. The eye gaze tracking module is configured to provide an eye gaze information of the user to the AR device. The AR device is configured to forward the eye gaze information of the user to the AR server. The AR server is configured to provide AR content to the AR device based on the eye gaze information of the user.

In another implementation, the system includes a WebAR module. The WebAR module is configured to cooperate with the AR device and provide at least one supplementary AR field of view based on the web session information.

In another implementation, the system includes a SmartAR module. The SmartAR module is configured to cooperate with the AR device and determine placement position of the AR field of view based on the web session information.

In another implementation, the web session information includes AR metadata, the eye gaze information of the user, and field of view of the webpage.

In another implementation, the eye gaze information includes position information, field of view information and gaze information.

In another implementation, the eye gaze information is calculated based on tracking of eye gaze and finding coordinates of eye gaze on the display area associated with the browsing device having web browsing application.

In another implementation, the eye gaze information calculation is based on AR device's camera calculation of user focus point coordinates with respect to AR view and browsing device's camera calculation of user focus point coordinates with respect to the display area associated with the browsing device.

In another implementation, the eye gaze information calculation is based on AR device's camera calculation of user focus point coordinates with respect to AR view and user focus element on document object model (DOM) tree.

In another implementation, the fetched AR content of whole page as well as selective filtered content based on the eye gaze information rendered on the display device associated with the AR device.

In another embodiment, a computer implemented system for providing multi-view browsing experience in an augmented reality environment, includes a memory configured to store pre-defined rules. A processor is configured to generate system processing commands based on the pre-defined rules. Further, the processor is configured to establish connection between an augmented reality (AR) device and one or more browsing devices. The browsing device is configured to provide a web session information to the AR device. The AR device is configured to forward the web session information to an AR server. The AR server is configured to fetch AR content from the web server based on web session information, and render the fetched AR content to the AR device. The AR device is configured to display the AR content along with original display based on the content displayed on a display area associated with the browsing device.

In another implementation, the browsing device is configured to cooperate with an eye gaze tracking module. The eye gaze tracking module is configured to provide an eye gaze information of the user to the AR device. The AR device is configured to forward the eye gaze information of the user to the AR server. The AR server is configured to provide AR content to the AR device based on the eye gaze information of the user.

In another implementation, the system further includes a WebAR module. The WebAR module is configured to cooperate with the AR device and provide at least one supplementary AR field of view based on the web session information.

In another implementation, the system further includes a SmartAR module. The SmartAR module is configured to cooperate with the AR device and determine placement position of the web AR field of view based on the web session information.

In another implementation, the web session information includes content source information (URL), the eye gaze information of the user, and/or the field of view of the webpage.

In another implementation, the eye gaze information includes position information, field of view information and gaze information.

In another implementation, the eye gaze information is calculated based on tracking of eye gaze and finding coordinates of eye gaze on the display area associated with the browsing device having web browsing application.

In another implementation, the eye gaze information calculation is based on AR device's camera calculation of user focus point coordinates with respect to AR view and browsing device's camera calculation of user focus point coordinates with respect to the display area associated with the browsing device.

In another implementation, the eye gaze information calculation is based on AR device's camera calculation of user focus point coordinates with respect to AR view and user focus element on document object model (DOM) tree.

In another implementation, the fetched AR content of whole page as well as selective filtered content based on the eye gaze information rendered on the display device associated with the AR device.

In another embodiment, a computer implemented system for providing multi-view browsing experience in an augmented reality environment, includes a memory configured to store pre-defined rules. A processor is configured to generate system processing commands based on the pre-defined rules. The processor provides the AR device information and/or an AR server information to the browsing device. The browsing device is configured to provide a web session information along with the AR device information and/or the AR server information to a web server. The web server is configured to provide AR content to the AR server using web session information. The browsing device is configured to cooperate with an eye gaze tracking module, the eye gaze tracking module configured to provide an eye gaze information of the user to the AR device. The AR device is configured to forward the eye gaze information of the user to the AR server. The AR server is configured to provide AR content to the AR device based on the eye gaze information of the user. The AR device is configured to display AR content along with original display based on the content displayed on a display area associated with the browsing device.

In another implementation, the system further includes a WebAR module. The WebAR module is configured to cooperate with the AR device and provide at least one supplementary AR field of view based on the web session information.

In another implementation, the system further includes a SmartAR module. The SmartAR module is configured to determine placement position of the AR field of view based on the web session information.

In another implementation, the web session information includes at least one of an URL information, field of view information, at least one supplementary AR field of view information received from the web server.

In another implementation, the eye gaze information includes position information, field of view information and gaze information.

In another implementation, the eye gaze information is calculated by the eye gaze tracking module based on tracking of eye gaze and finding coordinates of eye gaze on the display area associated with the browsing device.

In another implementation, the eye gaze information calculation by the eye gaze tracking module based on AR device's camera calculation of user focus point coordinates with respect to AR view and browsing device's camera calculation of user focus point coordinates with respect to the display area associated with the browsing device.

In another implementation, the eye gaze information calculation by the eye gaze tracking module based on AR device's camera calculation of user focus point coordinates with respect to AR view and user focus element determined by a web engine.

In another implementation, the fetched AR content of whole page as well as selective filtered content based on the eye gaze information rendered on the display device associated with the AR device.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Apart from the webpage content, a web-browser itself has lots of supplementary information like previously open webpage, currently open TAB, list of bookmark sites, etc. To access this information, a user has to navigate through mouse or other medium of input control. These cases are never been considered in web base Augmented Reality scenarios. Below are the some of the other significant problems identified in this area which are never considered for better user AR experience:—

Modification in existing Webpage to align AR technology—Existing webpages required significant changes in the web server to provide AR information/objects.

Display device screen size limitation—Any display device has fixed screen size, which is causing less effective user experience. AR object has been drafted to the webpage which has initiated the AR request. These AR object overlap the actual webpage content, thereby loss of information.

Dependency on a camera associated with a displaying device—It passively detects an object within a field of view of a camera associated with a portable device and altering a part of the web page by drafting object in to a webpage. In a reverse scenario, identify an object in a webpage and draft in the field view of camera.

No browser supporting feature available as immersive view—Web browser has immense potential to provide relevant information to the AR server or the device, which was not utilized in any of the web AR cases. Web browser extracts useful information from the webpage, which should be used in AR immersive view.

Therefore, understanding user's viewing or problem associated with the current technology plays crucial role for enhancing AR viewing experience for a user. Many existing systems and methods provide AR based web browsing, which focused on integrating virtual content with the physical environment in a way that allows the user to engage naturally with the blended reality. The immersive web means virtual world experiences hosted through the browser. The immersive technologies include virtual reality (VR), augmented reality (AR), and mixed reality (MR). For example, immersive web-based shopping can allow the user to try out different furniture in home, try on clothes, or apply cosmetics, and an immersive real estate application can allow the user to walk through a home for sale.

Further, in current AR and a Web scenario, suppose a user is browsing on a mobile device having a display area, browser, and a camera, and within the web page the user found AR content. The user has to click on a button provided on an element to view as full screen. In next step, the user can see the same element superimposed on live view of a rear camera of the mobile device. Then he clicks a button on full view to go back to a main page. However, the user cannot see web page when AR content is being shown. A browsing device should have a rear camera for AR content to be shown, which means these AR content can be shown only on a mobile type device not on TV display devices.

Further, a webpage may have more than one tab at a time, but a user can see only one tab at a time. If the user wants to see other tabs, he needs to click on that particular tab to see it, or he can hover on the tab to view thumbnail of that tab. The user cannot see different tabs at a time without navigating away from a current tab. The webpage may have different hyperlinks, which can be seen only by clicking on that hyperlink which in turn will change the current webpage. The user cannot see the webpage on link without staying on the current page. If the size of the webpage is larger than the current screen (display), then horizontal/vertical scroll bar will come on the webpage and user needs to do scrolling left or right to check the webpage content outside the screen, in that case current view will be changed. There is no provision to see scrollable page without scrolling. While playing video games on a browser, controls use to appear on the screen on either side which obstructs the game view; controls cannot be seen separately to give user a better experience.

FIG. 1 is a block diagram illustrating a computer implemented system for providing multi-view browsing in an augmented reality environment, according to an embodiment of the disclosure.

Referring to FIG. 1, the computer implemented system 100 for providing multi-view browsing experience in an augmented reality environment (hereinafter referred as "system"), includes an augmented reality (AR) device 102, one or more browsing devices 104a, 104b, . . . 104n, an AR server 106, a web server 108, and a web engine 110.

The AR device 102 is associated with a user. The AR device 102 is communicatively coupled with the one or more browsing devices 104a, 104b . . . 104n via a wireless or a wired network. Examples of the wired networks include a Wide Area Network (WAN) or a Local Area Network (LAN), a client-server network, a peer-to-peer network, and so forth. Examples of the wireless networks include Wi-Fi, a Global System for Mobile communications (GSM) network, and a General Packet Radio Service (GPRS) network, an enhanced data GSM environment (EDGE) network, 802.5 communication networks, Code Division Multiple Access (CDMA) networks, or Bluetooth networks.

Further, the AR device 102 is configured to cooperate with the AR server 106. The one or more browsing devices 104a, 104b ... 104n are configured to cooperate with the web server 108. Further, the AR device 102 and the one or more browsing devices 104a, 104b ... 104n are configured to cooperate with the web engine 110. In an embodiment, the web engine 110 is a browser engine configured to transform HTML documents and other resources of a web page into an interactive visual representation on the browsing device 104 or the AR device 102.

In an embodiment, the one or more browsing devices 104a, 104b ... 104n may be electronic devices, but are not limited to, a personal computer, a laptop, a tablet, a smartphone/phone, or other web enabled devices. In an embodiment, the one or more browsing devices 104a, 104b ... 104n can be associated with multiple users.

In an embodiment, the system 100 identifies a relevant content of a web page element to be used as AR content. Further, a display device may not affect user experience. AR glasses may display AR content outside the display area within the AR glasses view area. This ensures that a user has a complete visibility of the display device.

In an embodiment, the system 100 provides AR based web browsing experience. The system 100 displays the existing view of web page and overlays supplementary information of web content on the webpage through AR view. A user has to wear AR eyepiece to intercept the web content data and re-display its interactive augmented view on an AR plane. To enable this, an AR browsing mode for AR viewing using eye gaze or any other focus methods, only a person wearing the AR glasses is able to see AR content of the web page. For another person wearing no AR glasses, he or she may be able to see a normal web page.

Further, the system 100 provides AR smart usage with browsing devices 104. Typically, there are a lot of useful data in web pages, which a user sees with multiple activities such as a mouse hover, a focus, a click event. The user can see these data which are useful but only after making some efforts of focus/input devices such as a mouse. The system 100 may parse web page information and show the useful information at a point when the user is viewing a particular element of the web page. For example, Shopping Sites:—Nowadays e-commerce web sites are widely used by users to do online shopping, where a user checks for a product but in a main page the user may not be able to find product images from different viewing angle, product details etc. Therefore, the system 100 may parse information details of the product from web pages links and show the product via AR view for better user experiences.

Login on Websites:—On web sites, while typing a password for a login, a user enters wrong password and whole process has to be repeated (as passwords are in asterisk form). Therefore, the system 100 may display actual password via the AR view.

Scroll free mode:—Websites with horizontal scroll is very cumbersome to read. Therefore, the system 100 provides a feature of showing a hidden left side view via the AR view of the AR device 102.

Figure 2A:
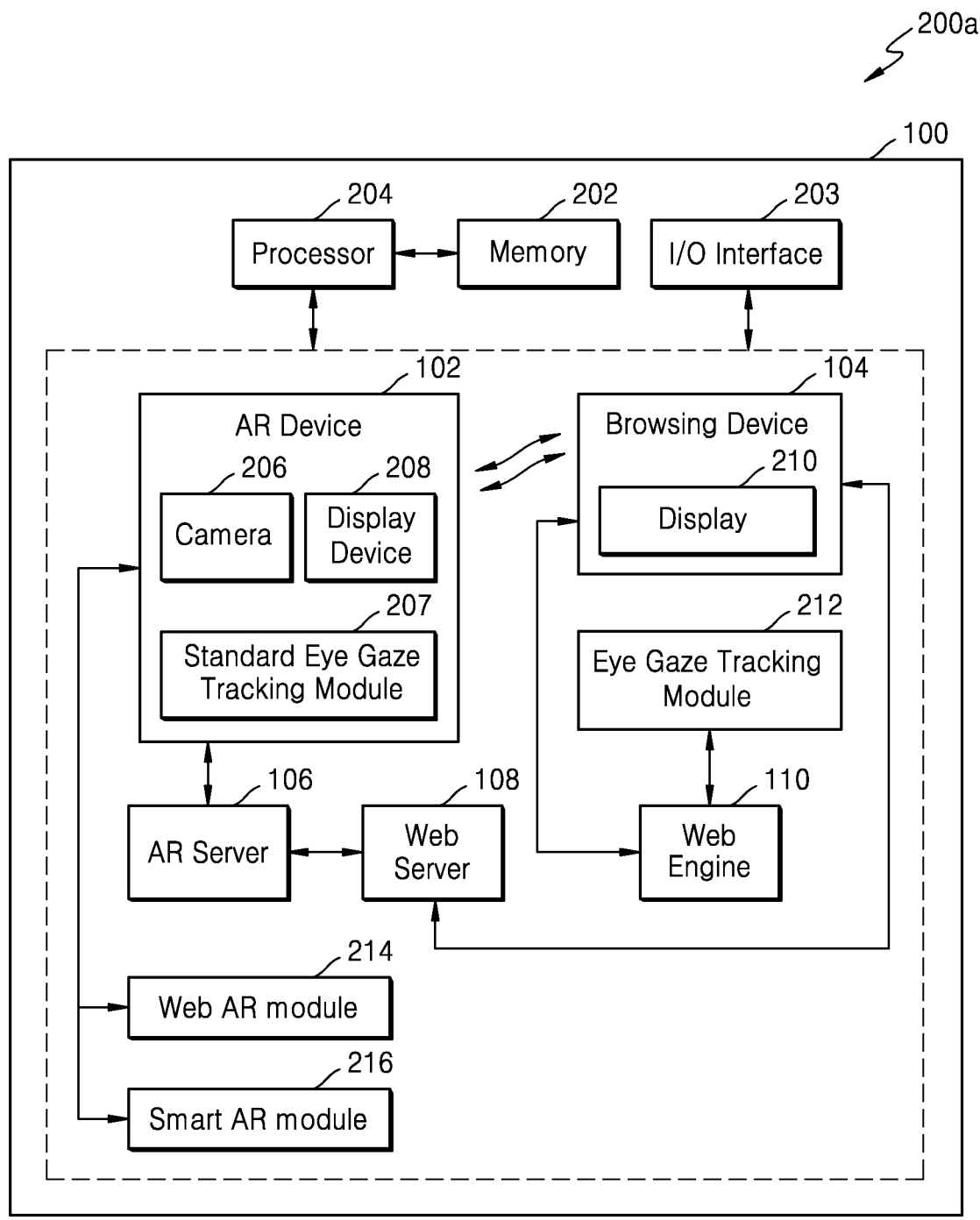
FIG. 2A is a block diagram 200 illustrating a computer implemented system for providing multi-view browsing experience in an augmented reality environment, according to an embodiment of the disclosure.

FIG. 2A is a block diagram 200a illustrating a computer implemented system for providing multi-view browsing experience in an augmented reality environment, according to an embodiment of the disclosure.

Referring to FIG. 2A, the system 100 may include, but not limited to a memory 202, a processor 204, an AR device 102, a browsing device 104, an AR server 106, a web server 108, and a web engine 110.

In an embodiment, the processor 204, the memory 202, the I/O interface 203, the WebAR module 214, the SmartAR module 216, and/or the Web Engine 110 may be included in the AR device 102. In another embodiment, the processor 204, the memory 202, and/or the I/O interface 203 may be included in the browsing device 104. In an embodiment, the processor 204, the memory 202, the I/O interface 203, the WebAR module 214, the SmartAR module 216, and/or the Web Engine 110 may be included in any third party device other than the AR device 102 or the browsing device 104 in the system 100.

The memory 202 is configured to store pre-determined rules and/or data related to identification of location, data extraction, determination of information, mapping, and recognition of texts and images. The memory 202 is also configured to store data related to pre-defined locations. In an embodiment, the memory 202 can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 202 may also include a cache memory to work with the system 100 more effectively.

The processor 204 is configured to cooperate with the memory 202 to receive the pre-determined rules and/or data. The processor 204 is further configured to generate system processing commands. In an embodiment, the processor 204 may be implemented as one or more microprocessors, microcomputers, microcontrollers, digital signal processors, central processing units, state machines, logic circuitries, and/or any devices that manipulate signals based on operational instructions. Among other capabilities, the at least one processor 204 is configured to fetch the pre-determined rules and/or data from the memory 202 and execute different modules of the system 100.

In an embodiment, the processor 204 is configured to establish a connection between the AR device 102 and the one or more browsing devices 104.

The system 100 may include an I/O interface 203 configured to cooperate with various modules or hardware units of the system 100. The I/O interface 203 may include a variety of software and hardware interfaces, for example, a web interface, a graphical user interface, and the like. The I/O interface 203 may allow the processor 204 to interact with a user directly or through the user computing devices such as the AR device 102, and the one or more browsing devices 104. Further, the I/O interface 203 may enable the processor 204 to communicate with other user devices or computing devices, such as web servers and external data servers (not shown). The I/O interface 203 can facilitate multiple communications within a wide variety of networks and protocol types, including wired networks, for example, LAN, cable, etc., and wireless networks, such as WLAN, cellular, or satellite. The I/O interface 203 may include one or more ports for connecting various devices to one another or to another server.

The AR device 102 may include a camera 206 and a display device 208. In an embodiment, the display device 208 includes a display screen. The browsing device 104 includes a display 210. In an embodiment, the system 100 provides a functionality of pairing between the AR device 102 and the display device 208. After an initial connection of the AR device 102 with the display device 208, the AR device 102 obtains a URL which is opened on another device. The AR device 102 fetches the title of URL from the web server and matches the title of URL with a title displayed on the display device (display device title can be fetched by processing display device screen using existing AI mechanism). If it is not matched, the AR device 102 disconnects connection and searches for another available display device for a connection.

Figure 2B:
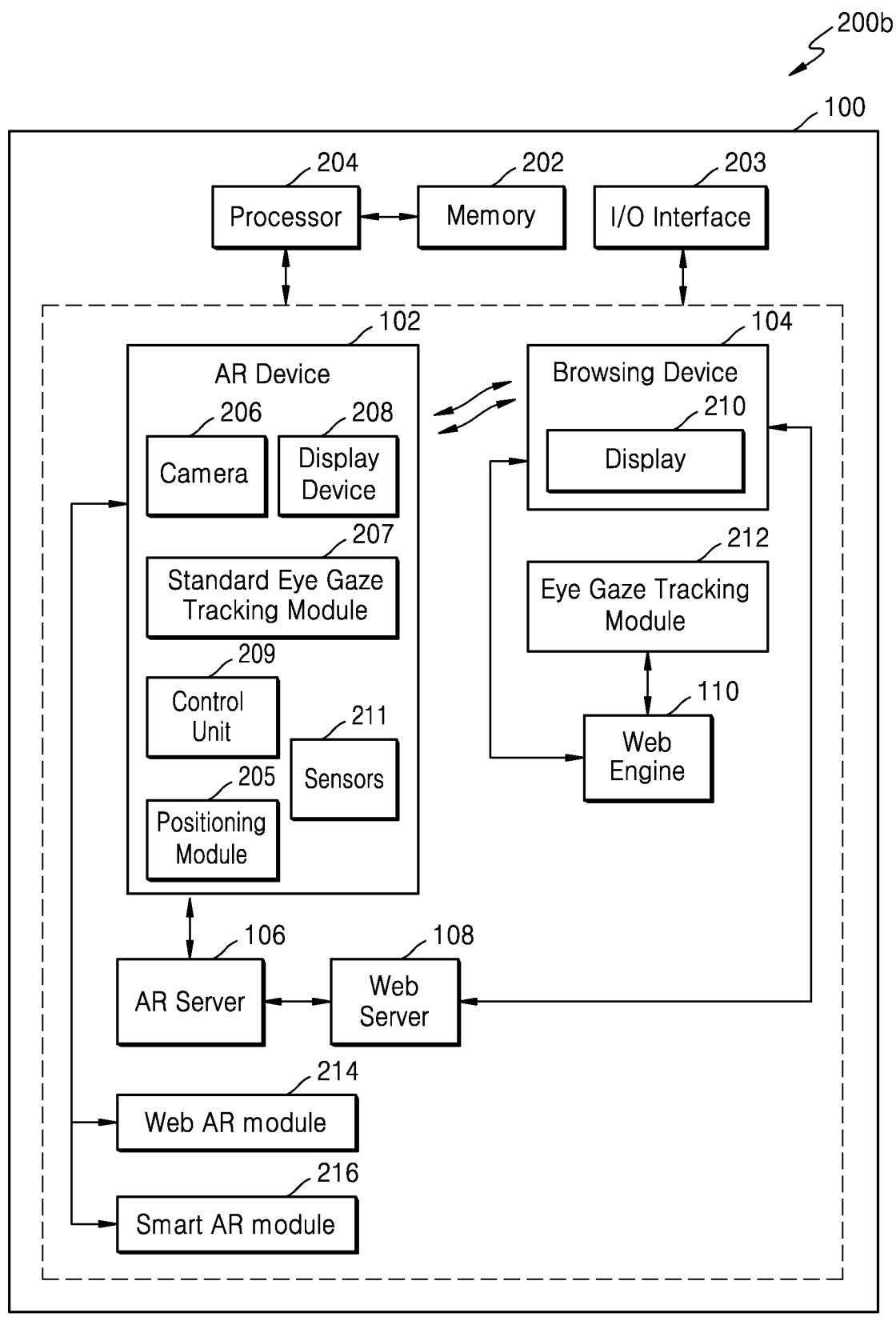
FIG. 2B is a block diagram illustrating a computer implemented system for providing multi-view browsing experience in an augmented reality environment, according to an embodiment of the disclosure.

FIG. 2B is a block diagram 200b illustrating a computer implemented system for providing multi-view browsing experience in an augmented reality environment, according to an embodiment of the disclosure.

Referring to FIG. 2B, in an embodiment, the processor 204, the memory 202, the I/O interface 203, the WebAR module 214, the SmartAR module 216, and/or the Web Engine 110 may be included in the AR device 102. In another embodiment, the processor 204, the memory 202, and/or the I/O interface 203 may be included in the browsing device 104. In an embodiment, the processor 204, the memory 202, the I/O interface 203, the WebAR module 214, the SmartAR module 216, and/or the Web Engine 110 may be included in any third party device other than the AR device 102 or the browsing device 104 in the system 100.

Referring to FIG. 2B, the AR device 102 includes, a positioning module 205, a control unit 209, and sensors 211. In an embodiment, the AR device 102 can be a wearable glass. In one embodiment, the positioning module 205 may include Global Positioning System (GPS). The control unit 209 may be implemented as a hardware processor and is configured to control various units for the AR device 102. In an embodiment, the control unit 209 is configured to interact with or control the camera 206, the display device 208, the sensors 211, and a standard eye gaze tracking module 207. For example, the control unit 209 may receive data from the sensors 211 or the positioning module 205, and analyze the received data, and output the contents through the display device 208. The sensors 211 are configured to sense a motion and/or actions of the user. In an embodiment, the sensors 211 include an acceleration sensor, a tilt sensor, a gyro sensor, a three-axis magnetic sensor, and a proximity sensor.

The standard eye gaze tracking module 207 is configured to track an eye gaze of the user and generate eye gaze information of the user. In an embodiment, the standard eye gaze tracking module 207 is configured to analyze the position information, coordinates, field of view information, and gaze information. In an embodiment, a user may view an object by using AR glasses. The standard eye gaze tracking module 207 automatically detects the coordinates and calculates a user focus point by using focus elements present on DOM (data object model) tree.

The browsing device 104 is configured to request AR enabled webpages from the web server 108. The browsing device 104 is further configured to provide web session information to the AR device 102. The AR device 102 is configured to forward the web session information to the AR server 106. The AR server 106 is configured to fetch AR content from the web server 108 and provide the fetched AR content to the AR device 102. In an embodiment, the AR device 102 is configured to display the AR content on the display device 208 along with original display based on the content displayed on a display 210 associated with the browsing device 104. In an embodiment, the fetched AR content of whole page as well as selective filtered content based on the eye gaze information are rendered on the display device 208 in the AR device 102.

The system 100 further includes an eye gaze tracking module 212. The eye gaze tracking module 212 may be an eye gaze tracking sensor. The eye gaze tracking module 212 is configured to cooperate with the browsing device 104. The eye gaze tracking module 212 is configured to generate and provide eye gaze information of the user to the AR device 102. In an embodiment, the AR device 102 is configured to forward the eye gaze information of the user to the AR server 106. Further, the AR server 106 is configured to provide the AR content to the AR device 102 based on the eye gaze information of the user. The eye gaze information includes position information of the AR device 102, field of view information, and gaze information. In another embodiment, the eye gaze information is calculated based on tracking of an eye gaze and finding coordinates of eye gaze on the display area associated with the browsing device 104 having web browsing application. In another embodiment, the eye gaze information is derived based on AR device's camera 206 calculation of user focus point coordinates with respect to AR view and browsing device's camera calculation of user focus point coordinates with respect to the display 210 associated with the browsing device 104. In one of the embodiments, the eye gaze information calculation is based on AR device's camera 206 calculation of user focus point coordinates with respect to AR view and user focus element on document object model (DOM) tree. In another embodiment, the eye gaze information is calculated with the eye gaze tracking module 212 based on AR device's camera 206 calculation of user focus point coordinates with respect to AR view and user focus element determined by the web engine 110.

In an embodiment, the system 100 includes a WebAR module 214. The WebAR module 214 is configured to cooperate with the AR device 102 and provide at least one supplementary AR field of view based on the web session information.

In another embodiment, the system 100 includes a SmartAR module 216. The SmartAR module 216 is configured to interact with the AR device 102 and determine placement position of the AR field of view based on the web session information. In an embodiment, the web session information includes AR metadata, the eye gaze information of the user, and field of view of the web page. The web session information further includes at least one of URL information, field of view information, at least one supplementary AR field of view information received from the web server 108.

In an embodiment, the WebAR module 214 and the SmartAR module 216 may be located in the vicinity of the AR device 102. In another embodiment, the web engine 110 and the eye gaze tracking module 212 are located in the vicinity of the browsing device 104.

Figure 3:
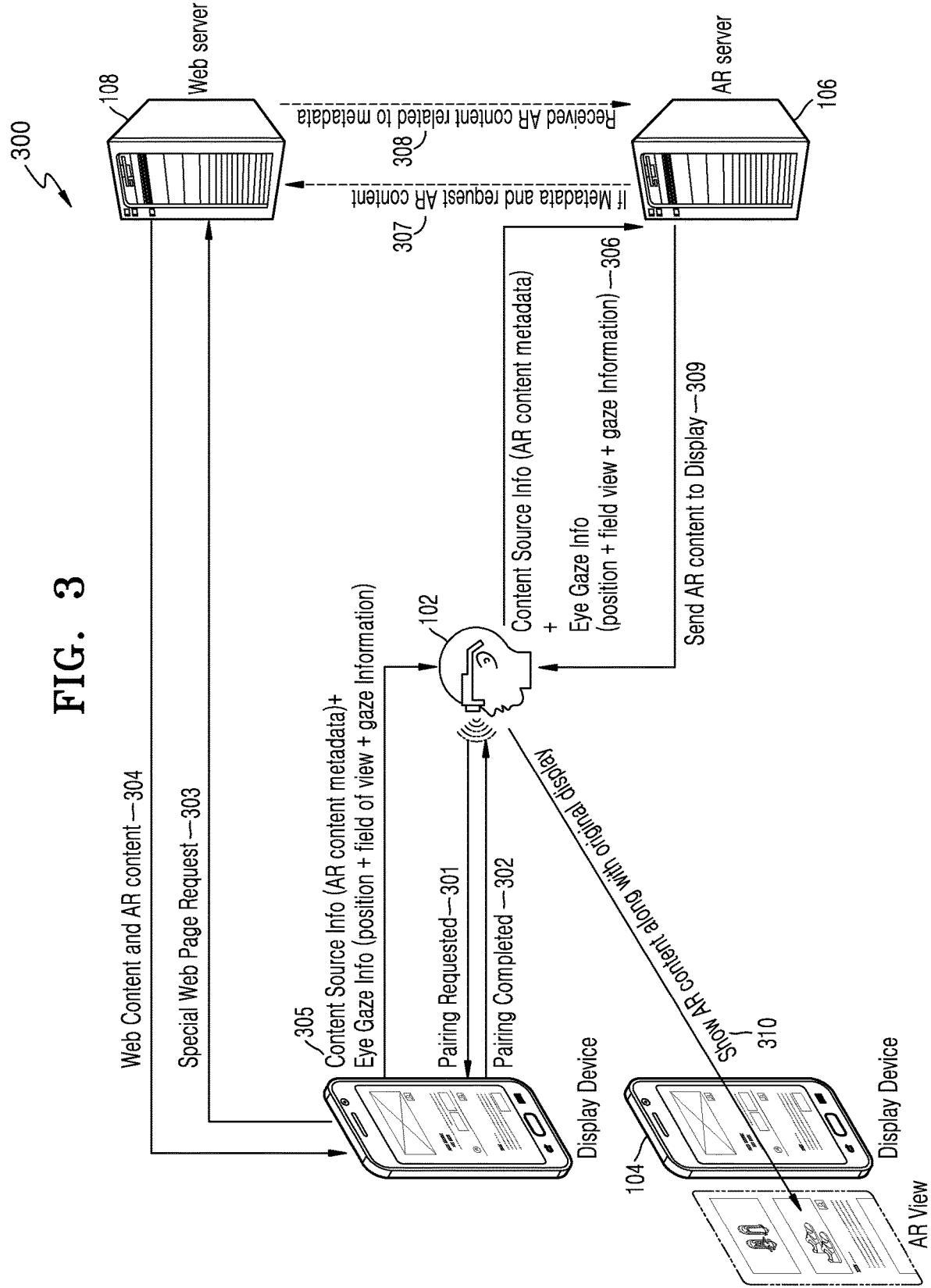
FIG. 3 illustrates a flow diagram depicting a process of obtaining AR content from a web server, according to an embodiment of the disclosure.

FIG. 3 illustrates a flow diagram 300 depicting a process of obtaining AR content from a web server, according to an embodiment of the disclosure.

More specifically, FIG. 3 illustrates the browsing device pulled AR content from a web server 108 with an eye gaze or without an eye gaze.

Referring to FIG. 3, a process of obtaining a browsing device pulled AR content from the web server 108 without an eye gaze is described as follows. In operation 301, the browsing device 104 and the AR device 102 pairing is requested. In operation 302, the pairing is completed. In operation 303, the browsing device 104 transmits a request for a special webpage to the web server 108. In operation 304, the browsing device receives Web content and AR content from the web server 108. In operation 305, the browsing device 104 transmits the content source information (i.e. AR content metadata) to the AR device 102. In operation 306, the AR device 102 forwards the content source information (i.e. AR content metadata) to the AR server 106. In operation 307, the AR server 106 forwards the content source information and transmits a request for AR content corresponding to the content source information. In operation 308, the AR server 106 receives AR content related to the content source information from the web server 108. In operation 309, the AR server 106 sends the AR content to the display device 208. In operation 310, the AR device 102 displays AR content along with original display. The original display may indicate content or web page displayed on the display device 208. The AR content may be displayed in parallel with or outside the original display as shown in FIG. 3.

Next, a process of pulling AR content from the web server 108 with an eye gaze is described as follows referring to FIG. 3. In operation 301, the browsing device 104 and the AR device 102 pairing is requested. In operation 302, the pairing becomes completed. In operation 303, the browsing device 104 sends a request for a special webpage to the web server 108. In operation 304, the browsing device receives (Web and AR) content from the web server 108. In operation 305, the browsing device 104 transmits the content source information (i.e. AR content metadata) and the eye gaze information (i.e. position, field of view and gaze information) to the AR device 102. In operation 306, the AR device 102 forwards the content source information (i.e. AR content metadata) and the eye gaze information (i.e. position, field of view, and gaze information) to the AR server 106. In operation 307, the AR server 106 transmits a request for AR content corresponding to the content source information to the web server 108. In an embodiment, the AR server 106 may transmit the content source information along with the request to the web server 108. In response to the request for AR content, the AR server 106 may receive AR content requested from the web server 108, if AR content corresponding to metadata included in the content source information is found at the web server 108 in operation 308. In operation 309, the AR server 106 transmits AR content to the display device 208 of the AR device 102. In operation 310, the AR device 102 displays AR content along with original display.

Figure 4:
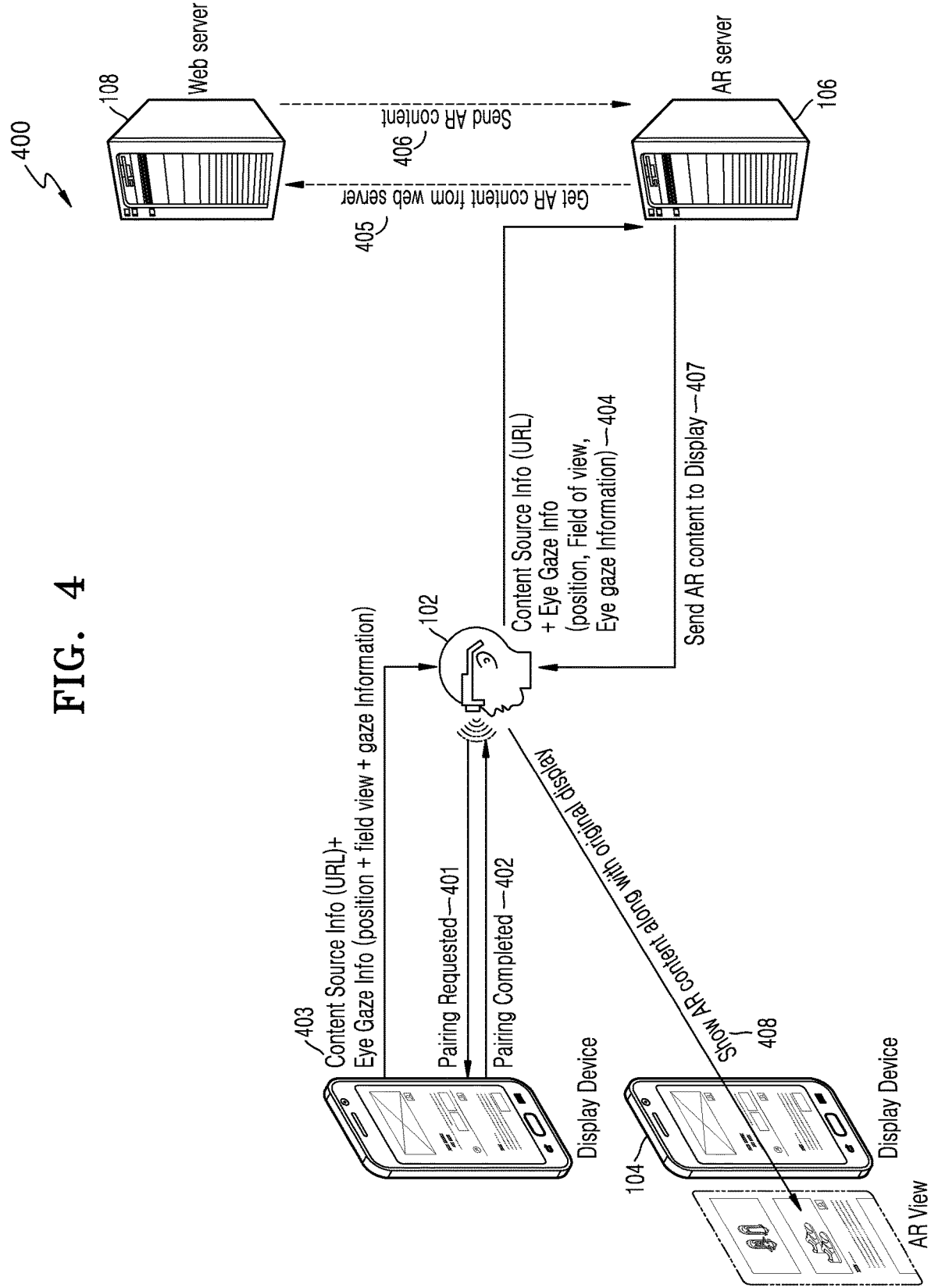
FIG. 4 illustrates a flow diagram depicting an AR server pulled AR content from a web server, according to an embodiment of the disclosure.

FIG. 4 illustrates a flow diagram 400 depicting an AR server pulled AR content from a web server, according to an embodiment of the disclosure.

More specifically, FIG. 4 illustrates a flow diagram depicting an AR server 106 pulled AR content from a web server 108 with an eye gaze or without an eye gaze.

Referring to FIG. 4, a process of obtaining an AR server pulled AR content from the web server 108 without an eye gaze is described as follows.

In operation 401, the pairing between the browsing device 104 and the AR device 102 is requested. In operation 402, the pairing becomes completed. In operation 403, the browsing device 104 shares content source information including the content source address (URL) with the AR device 102. In operation 404, the AR device 102 forwards the content source information such as address information (URL) related to the AR content to the AR server 106. In operation 405, the AR server 106 fetches AR content from the web server using the content source information. In operations 406, the AR server 106 obtains the AR content from the web server 108 and in operation 407, the AR server 106 sends the AR content to the display device 208 of the AR device 102. In operation 408, the AR device 102 displays the received AR content along with original display.

Next, a process of obtaining an AR server pulled AR content from the web server 108 with an eye gaze is described as follows referring to FIG. 4.

In operation 401, the pairing between the browsing device 104 and the AR device 102 is requested. In operation 402, the pairing becomes completed. In operation 403, the browsing device 104 transmits the content source information including address information (URL) corresponding to the AR content to be pulled and the eye gaze information (i.e. position information of content displayed on the display device 208, field of view, and gaze information) to the AR device 102. In operation 404, the AR device 102 forwards the content source information (URL) and the eye gaze information (i.e. position information of content displayed on the display device 208, field of view of the user, and gaze information) to the AR server 106. In operation 405, the AR server 106 transmits the content source information (URL) to fetch AR content from the web server. In operation 406, the AR server 106 obtains AR content from the web server 108 and in operation 407, the AR server 106 sends the obtained AR content to the display device 208 of the AR device 102. In operation 408, the AR device 102 displays AR content along with original display on the display device 208.

Figure 5:
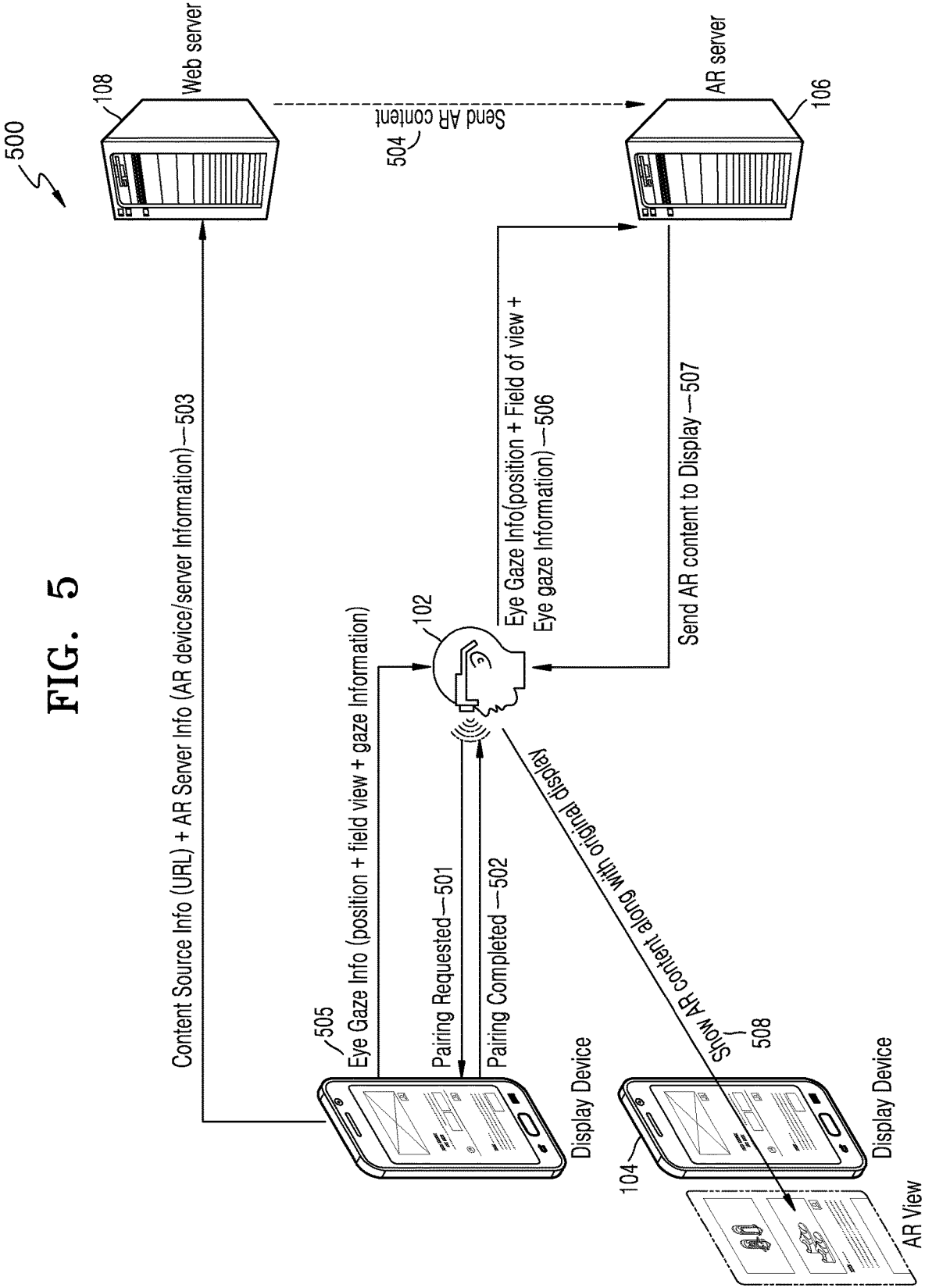
FIG. 5 illustrates a flow diagram depicting AR content pushed by a web server to an AR server, according to an embodiment of the disclosure.

FIG. 5 illustrates a flow diagram 500 depicting AR content pushed by a web server to an AR server, according to an embodiment of the disclosure.

More specifically, FIG. 5 illustrates a flow diagram 500 depicting AR content pushed by a web server 108 to an AR server 106 with an eye gaze and without an eye gaze.

Referring to FIG. 5, a process of obtaining AR content pushed by the web server 108 without an eye gaze is described as follows.

In operation 501, the pairing between the browsing device 104 and the AR device 102 is requested. In operation 502, the pairing is completed. In operation 503, the browsing device 104 transmits content source information (URL corresponding to the AR content) and AR server information (AR device/server information) to the web server 108. The AR server information may be information associated with accessing the AR server 106. For example, the AR server information may include network address information of the AR server 106. In operation 504, the web server 108 sends the AR content directly to the AR server 106 using the AR server information. In operation 507, the AR server 106 sends complete AR content to the AR device 102. In operation 508, the AR device 102 displays AR content along with the original display.

Next, a process of obtaining AR content pushed by the web server 108 with an eye gaze is described as follows referring to FIG. 5. In operation 501, the pairing between the browsing device 104 and the AR device 102 is requested. In operation 502, the pairing is completed. In operation 503, the browsing device 104 shares content source information such as URL corresponding to the AR content and AR server information (AR device/server information) with the web server 108. In operation 504, the web server 108 sends the AR content directly to the AR server 106 using the AR server information. In operation 505, the browsing device 104 sends eye gaze information (i.e. position, field of view, and gaze information) to the AR device 102. In operation 506, AR device 102 sends the eye gaze information to the AR server 106. In operation 507, the AR server 106 sends complete AR content based on the eye gaze information to the AR device 102. In an embodiment, AR content out of the complete AR content which corresponds to a link may be corresponding to a position in the display device 208 where the position may be determined by the eye gaze information. In operation 508, the AR device 102 displays AR content along with the original display.

Figure 6:
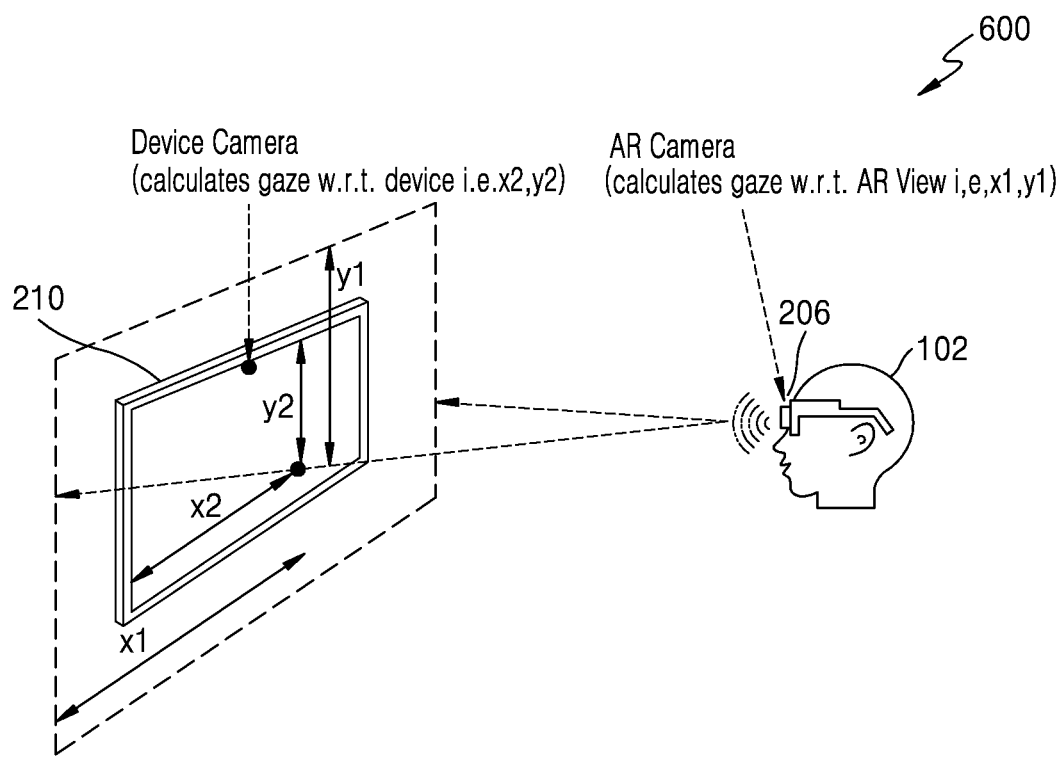
FIG. 6 illustrates a schematic diagram of eye gaze focus on webpage calculation, according to an embodiment of the disclosure.

FIG. 6 illustrates a schematic diagram 600 of eye gaze focus on webpage calculation, according to an embodiment of the disclosure.

Referring to FIG. 6, it shows eye gaze focus on webpage calculation methods. The processor or control unit 209 of the browsing device 104 calculates (x2, y2), where (x2, y2) is a user focus point with respect to the area of the display 210 and the AR camera 206 calculates (x1, y1), where (x1, y1) is a user focus point with respect to AR view. In an embodiment, if the browsing devices 104 have no front camera, the browsing device 104 calculates (x2, y2) using focus element on DOM (data object model) tree.

Figure 7:
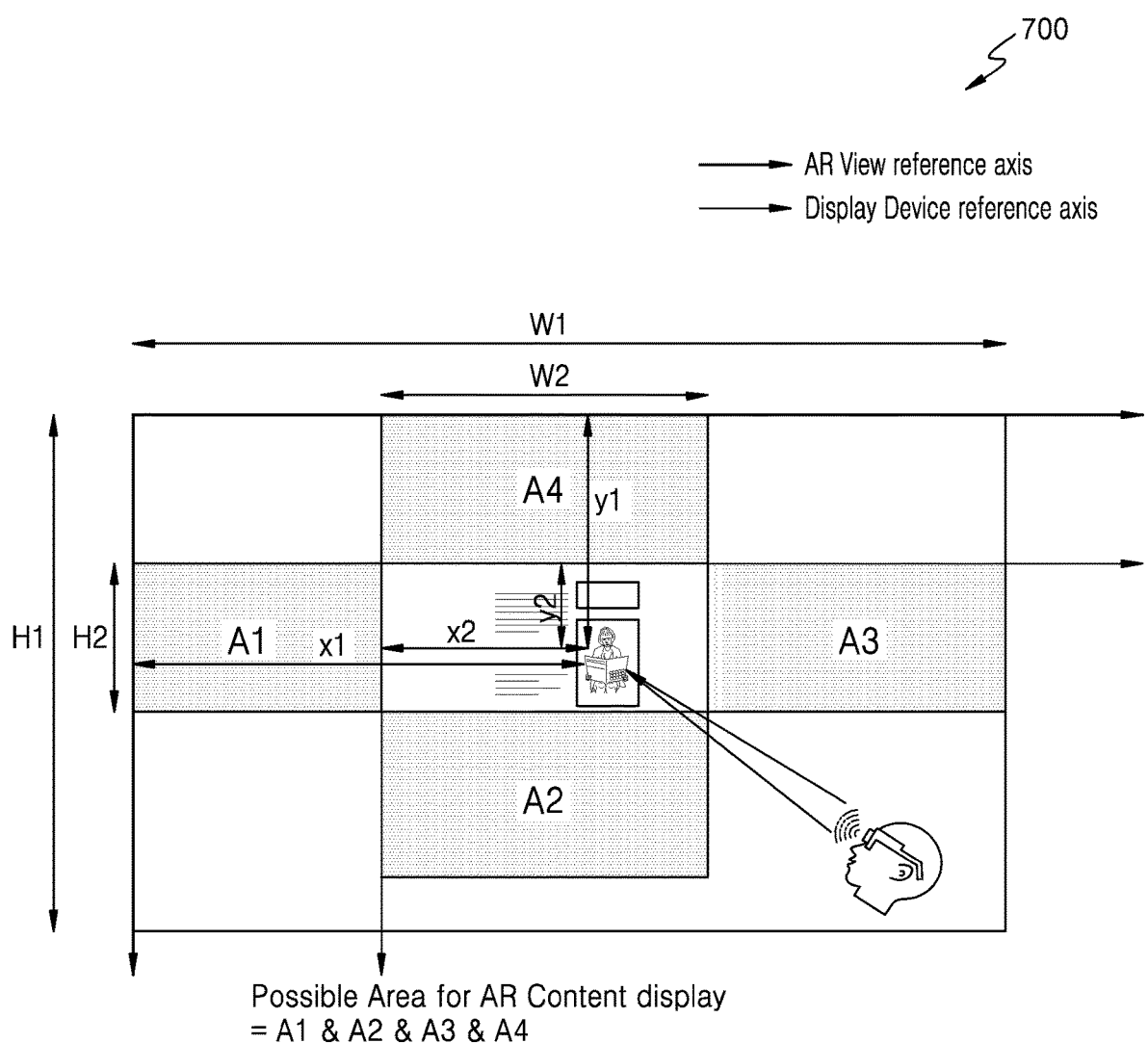
FIG. 7 illustrates a schematic diagram for placing supplementary information on AR view, according to an embodiment of the disclosure.

FIG. 7 illustrates a schematic diagram 700 for placing supplementary information on AR view, according to an embodiment of the disclosure.

Referring to FIG. 7, there are four adjacent possible areas to the display device 208 where AR content can be displayed. Referring to FIG. 7, top left corner of the AR view is considered as an AR axis reference point. Candidate areas for displaying AR content are A1, A2, A3, and A4 in FIG. 7 and areas of A1, A2, A3, and A4 are calculated in the following ways:

Calculation of A1
A1_start_x=AR View Ref.
A1_start_y=AR View Ref.+(y1−y2)
A1_width=x1−x2
A1_height=H2
Calculation of A2
A2_start_x=A1_start_x+A1_width
A2_start_y=AR View Ref.+(y1−y2)+H2
A2_width=W2
A2_height=H1−(y1−y2)−H2
Calculation of A3
A3_start_x=AR View Ref.+A1_width+W2
A3_start_y=AR View Ref.+(y1−y2)
A3_width=W1−(A1_width+W2)
A3_height=H2
Calculation of A4
A4_start_x=AR View Ref.+A1_width
A4_start_y=AR View Ref.
A4_width=W2
A4_height=y1−y2

Figure 8:
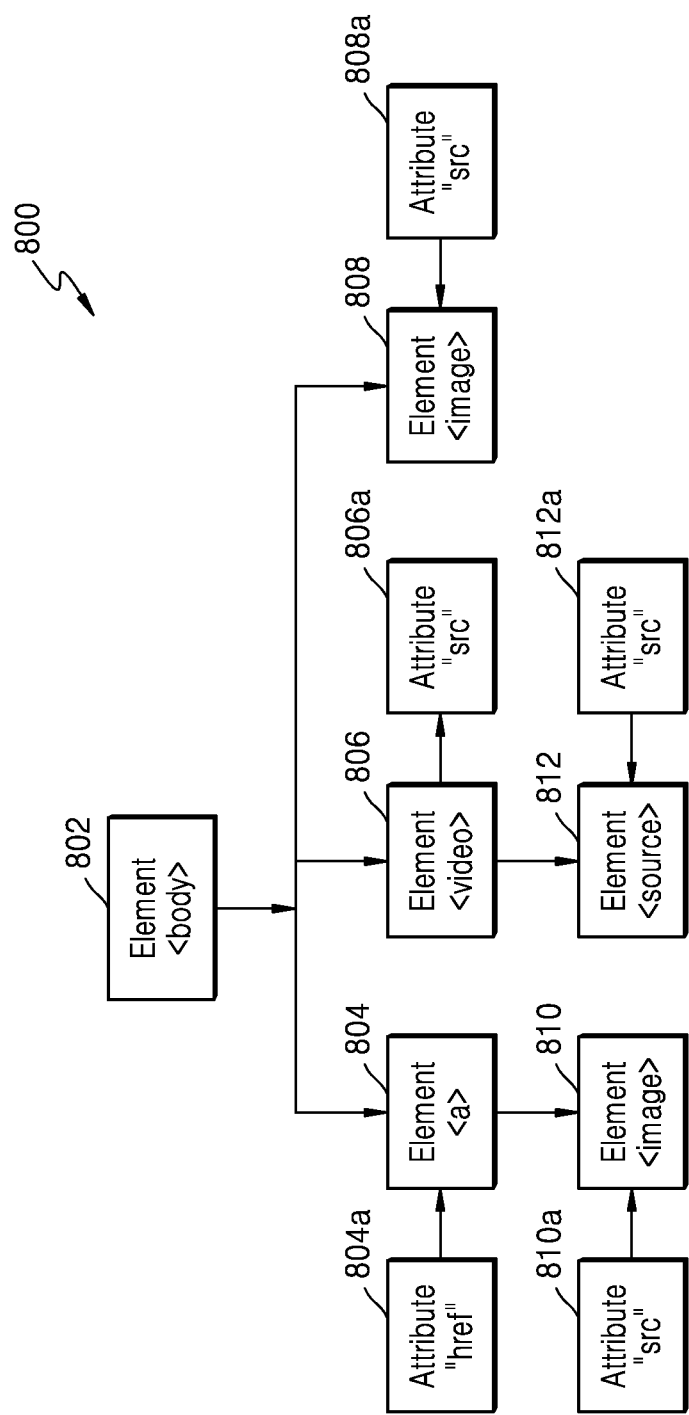
FIG. 8 illustrates a graphical representation of a structure of DOM tree elements and their properties, according to an embodiment of the disclosure.

FIG. 8 illustrates a graphical representation 800 of a structure of DOM tree elements and their properties, according to an embodiment of the disclosure.

Referring to FIG. 8, when a webpage is loaded, the web engine 110 creates a Document Object Model (DOM) of the webpage. The HTML DOM model is constructed as a tree of an object. The webpage consists of different types of element 802 such as image 804, video 806, links 808, and each type has its specific element 810, 812 in the DOM tree. Each DOM element has specific attributes, which hold information such as "src" 806a, 808a, 810a, 812a source of image 804 or video 808, "href" 804a link to URL 804.

Figure 9:
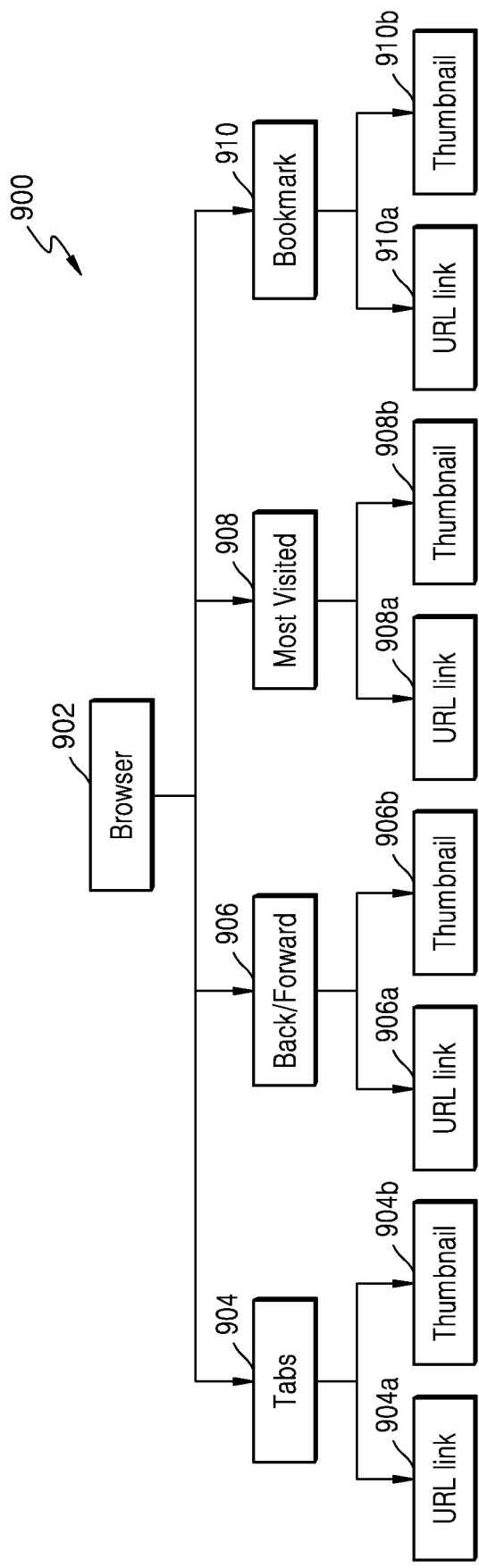
FIG. 9 illustrates a graphical representation of structure of browsing elements and their supplementary information, according to an embodiment of the disclosure.

FIG. 9 illustrates a graphical representation 900 of a structure of browsing elements and their supplementary information, according to an embodiment of the disclosure.

Referring to FIG. 9, the browser 902 consists of a number of modules which parse and/or store valuable information related to websites. The modules are, for example, bookmark 910, Most visited 908, Back/Forward 906 and Tabs 904 modules which contain information related to websites. This information can be used as supplementary information for AR Web Browsing. The modules further include sub elements such as URL link 904a, 906a, 908a, 910a, and Thumbnail 904b, 906b, 908b, 910b.

Figure 10:
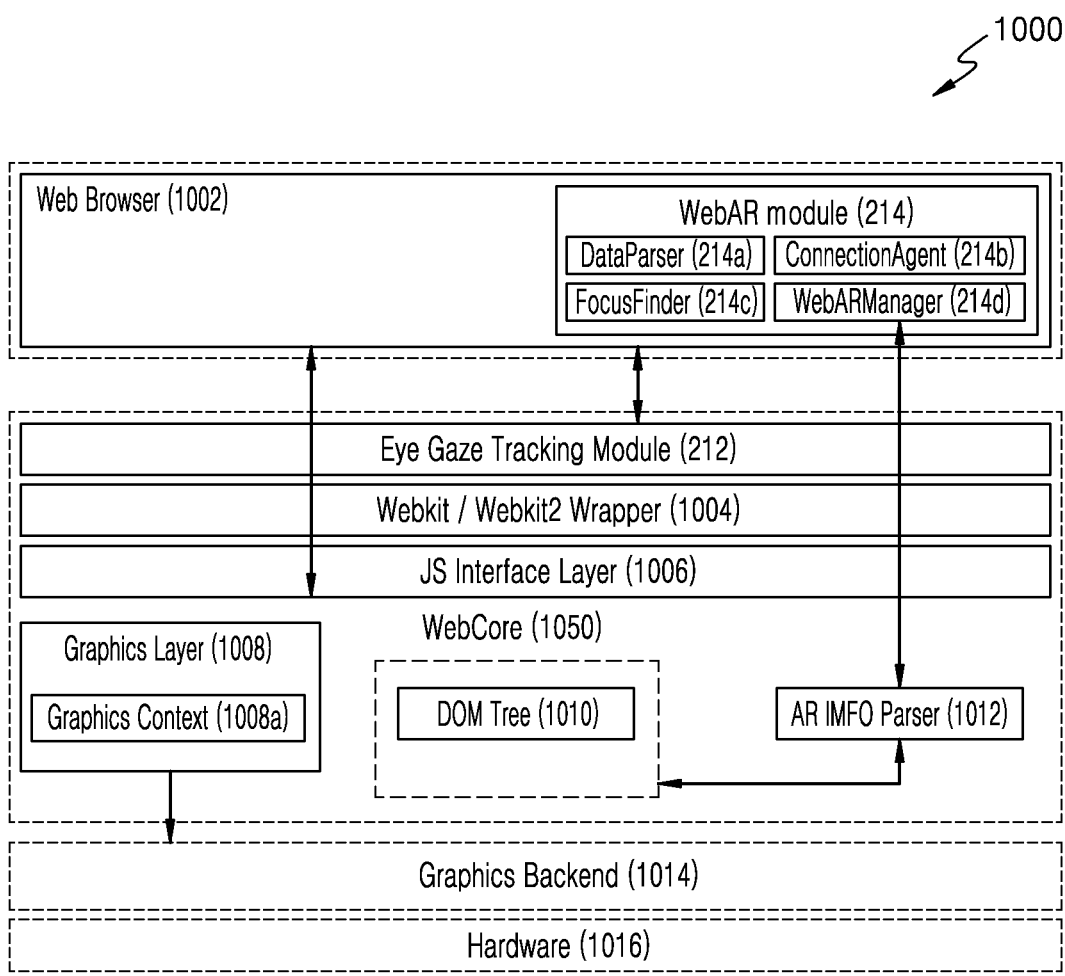
FIG. 10 illustrates a module diagram depicting a system for providing supplementary AR field of view based on web session information, according to an embodiment of the disclosure.

FIG. 10 illustrates a module diagram 1000 depicting a system for providing supplementary AR field of view based on web session information, according to an embodiment of the disclosure.

Referring to FIG. 10, the system 100 is implemented based on different modules which include a web browser 1002, graphics backend 1014, and hardware 1016. The user interacts with another user on the web browser 1002. The WebAR module 214 includes modules such as DataParser 214a, ConnectionAgent 214b, FocusFinder 214, and WebARManager 214d.

DataParser 214a: DataParser 214a communicates with AR Info Parser 1012 of a Web Core 1100 to fetch data of the web engine 110 to be shared with AR Device 102. DataParser 214a creates final data to be shared with the AR Device 102 either by itself (for data which is on browser side, e.g. tab view, history views etc.) or by communication with AR Info Parser 1012.

ConnectionAgent 214b: ConnectionAgent 214b connects to AR glasses once connection is initiated from AR side. ConnectionAgent 214b checks that connection is intact until the connection is closed from AR side.

FocusFinder 214c: FocusFinder 214c checks for the element on which user is focused through any mode. (Eye gaze/mouse/remocon etc.)

WebAR Manager 214d: WebARManager 214d uses all other sub modules to get the work done.

The web browser 1002 interacts with an eye gaze tracking module 212, a Webkit/Webkit 2 wrapper 1004, JS interface layer 1006, and WebCore 1050. The eye gaze tracking module 212 is configured to cooperate with the WebAR module 214. The eye gaze tracking module 212 is configured to track eye gazes and find coordinates of the eye gaze on the display 210 in the browsing device 104.

In an embodiment, a web kit includes a core rendering engine for handling HTML (WebCore 1050) for being embedded into browsers (Web kit). The WebCore 1050 includes a graphics layer 1008, a DOM tree 1010, and an AR INFO parser 1012. The graphics layer 1008 represents a layer that contains one or more graphic features 1008a. The DOM tree 1010 is configured to cooperate with the AR INFO parser 1012. By using the DOM tree 1010, the AR INFO parser 1012 finds and fetches relevant supplementary webpage information to be shared. The graphics layer 1008 is then used at the graphics backend 1014. The graphics backend 1014 is used to render the graphics in hardware 1016 without going through the entire graphics stack. The available graphics backend may be Cairo®, Enlightenment Foundation Libraries (EFL)®, OpenGES2®, Evas-GL®, and/or WAYLAND®.

Figure 11:
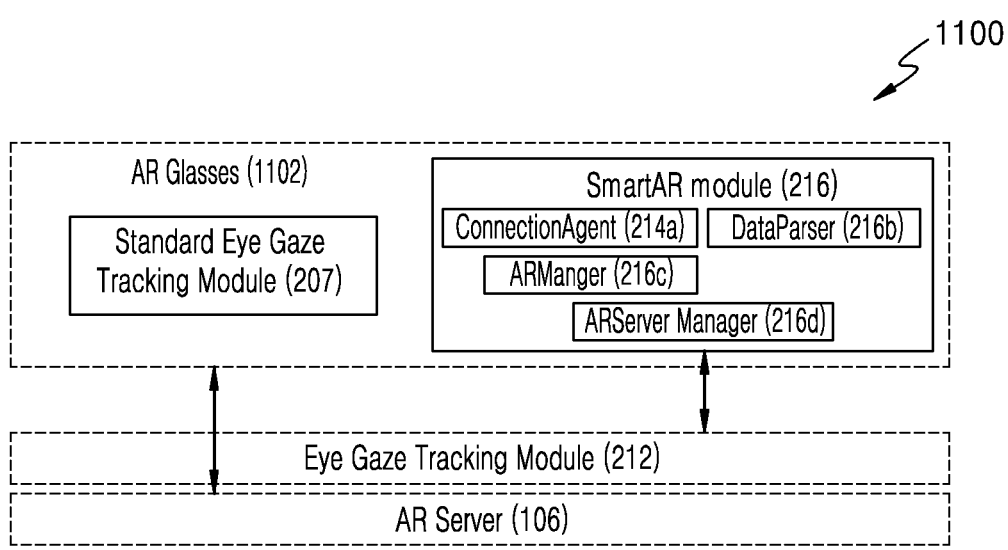
FIG. 11 illustrates a module diagram 1100 depicting a system for providing placement position of the AR field of view on the web session information, according to an embodiment of the disclosure.

FIG. 11 illustrates a module diagram 1100 depicting a system for providing placement position of the AR field of view on the web session information, according to an embodiment of the disclosure.

Referring to FIG. 11, the system 100 is implemented based on different modules, which include AR glasses 1102, an eye gaze tracking module 212, and an AR server 106. The AR glasses 1102 may include a standard eye gaze tracking module 207 and a SmartAR module 216. The SmartAR module 216 may include ConnectionAgent 214a, DataParser 214b, ARManager 214c, and ARServerManager 216d. The standard eye gaze tracking module 207 may be a camera implemented on the AR device 102. The standard eye gaze tracking module 207 is configured to determine a visual element on the webpage, which the user is looking at, and provide visual element information (text, image metadata, approximate position on the screen or a combination thereof) to the eye gaze tracking module 212 residing on a web browser (main display). Further, the web browser uses the visual element information to identify or determine the web element or the location/coordinates of the web element on the webpage after analyzing DOM from the web engine 110. In one embodiment, the AR web information as AR content corresponding to the web element or the coordinate of the web element can be extracted and displayed along with the display 210 in the browsing device 104. The foregoing function performed by the standard eye gaze tracking module 207 maybe also performed by the processor 204 by tracking an eye gaze with the camera implemented on the AR device 102.

The SmartAR module 216 is configured to communicate with the browsing device 104 and obtain supplementary information to be rendered on the AR device 102.

ConnectionAgent 216a: ConnectionAgent 216a initiates a connection with the browsing device 104, once the AR device 102 is triggered to connect to the browsing device 104.

DataParser 216b: DataParser 216b parses data received from the browsing device 104 and fetches the required data to be rendered on the AR device 102.

AR Manager 216c: AR Manager 216c uses all other sub modules to complete the work.

AR ServerManager 216d: AR ServerManager 216d communicates with the AR server 106 and receives the final composite image which has to render on the display device 208.

The eye gaze tracking module 212 is configured to track eye gazes and find coordinates of eye gazes on the display 210 in the browsing device 104. The AR server 106 is configured to provide AR content to the AR device 102 based on the eye gaze information of the user.

In an embodiment, Table 1 illustrates HTML property and supplementary information.

Figure 12:
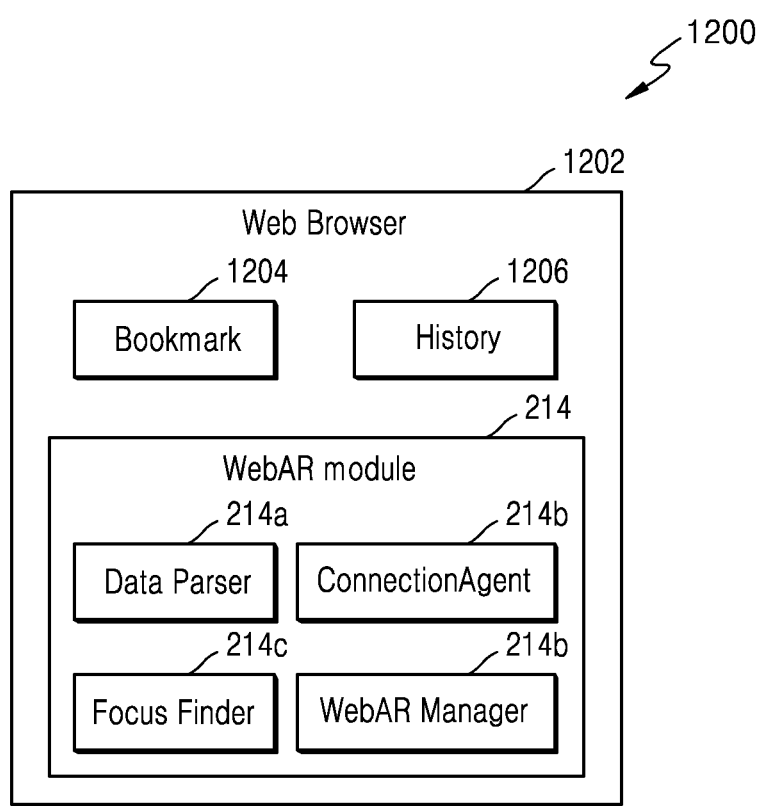
FIG. 12 illustrates a block diagram 1200 depicting a WebAR module 214, according to an embodiment of the disclosure.

FIG. 12 illustrates a block diagram 1200 depicting a WebAR module 214, according to an embodiment of the disclosure.

Referring to FIG. 12, the WebAR module 214 is a sub-module of a web browser 1202. The WebAR module 214 is configured to communicate with AR glasses 1102 and share with the AR glasses 1102 supplementary information to be rendered on the AR glasses 1102. The WebAR module 214 has also an access to AR info parser 1012, which is a sub-module of a rendering engine. The WebAR module 214 is configured to establish a connection between the browsing device 104 and the AR Device 102. The WebAR module 214 is configured to fetch the supplementary information/data from the browsing device 104. The WebAR module 214 is configured to send a request to the AR info parser 1012 to parse and fetch relevant supplementary information from the web engine 110. The WebAR module 214 is further configured to send data to the AR device 102 to display on the display device 208. The WebAR module 214 includes modules such as Data Parser 214a, Connection Agent 214b, Focus Finder 214, and WebAR Manager 214d.

Data Parser 214a:—DataParser 214a communicates with AR Info Parser 1012 of a WebCore 1050 to fetch data of the web engine 110 to be shared with AR Device 102. Data Parser 214a generates final data to be shared with the AR Device 102 either by itself (for data which is on browser side, e.g. tab view, bookmark 1204, history views 1206, etc.) or by communication with AR Info Parser 1012.

Connection Agent 214b: Connection Agent 214b connects to AR glasses once a connection is initiated from AR side. It checks that connection is intact until connection is closed from AR side.

Focus Finder 214c: Focus Finder 214c checks for the element on which user is focused through any mode. (Eye gaze/mouse/remocon etc.)

TABLE 1

| Focus Element Type | HTML Content | Supplementary Info |
|---|---|---|
| Hyper Link Text | <a href = "/news/central-banks-meeting/articleshow/51908361.cms"> What to look out for in the European Central Bank's meeting </a> | /news/central-banks-meeting/articleshow/51908361.cms Used For: Link Preview |
| Image | <a href = "http://indiatimes.com/surge-pricing/"> <img src = http://indiatimes.com/surge-pricing-51.jpg alt = "surge pricing" title = "In defence of surge pricing of Cab rides"> </a> | In defence of surge pricing of Cab rides Used For: Tooltip |
| Video | <video> <source src = "https://youtube.com/US-economy.mp4" type = "video/mp4"> </video> | https://youtube.com/US-economy.mp4 Used For: Video preview |
| Button | <button class = "dropbtn">Dropdown</button> <div class = "dropdown-content"> <a href = "#">Link 1</a> <a href = "#">Link 2</a> <a href = "#">Link 3</a> </div> | <div class = "dropdown-content"> <α href = "#">Link 1</α> <α href = "#">Link 2</α> <α href = "#">Link 3</α> </div> Used for: dropdown preview |
| Password field | <input type = "password" id = "ap_password" name = "password" tabindex = "2" class = "a-input-text a-span12 auth-autofocus auth-required-field"> | {Original password} Used for: Actual entered password will be shown. |
| Tooltip | <p title = "Free Web tutorials">W3Schools.com</p> | "Free Web tutorials" Used for: Tooltip |

WebAR Manager 214*d*: WebARManager 214*d* uses all other sub modules to get the work done.

Figure 13:
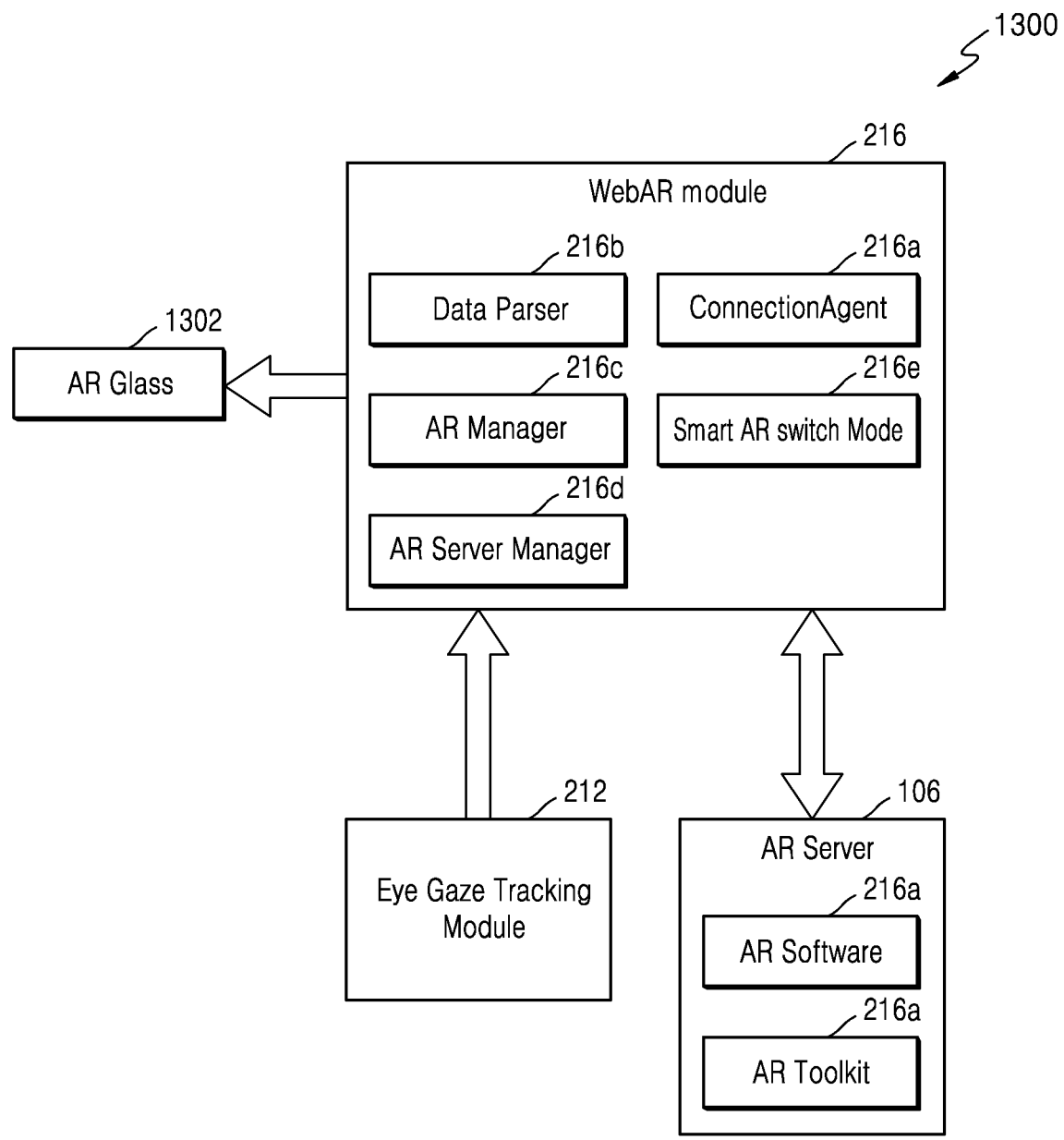
FIG. 13 illustrates a block diagram 1300 depicting a SmartAR module 216, according to an embodiment of the disclosure.

FIG. 13 illustrates a block diagram 1300 depicting a SmartAR module 216, according to an embodiment of the disclosure.

Referring to FIG. 13, the SmartAR module 216 is configured to communicate with the browsing device 104 and obtain supplementary information to be rendered on the AR device 102. The SmartAR module 216 is configured to establish a connection between the browsing device 104 and the AR Device 102. The SmartAR module 216 is configured to receive the supplementary information/data from the browsing device 104. The SmartAR module 216 is configured to send information to the AR server 106 for AR processing of data. The SmartAR module 216 is configured to receive a composite image from the AR server 106, and display a final image on the AR glass 1302. The SmartAR module 216 includes Connection Agent 216*a*, Data Parser 216*b*, AR Manager 216*c*, AR ServerManager 216*d*, and Smart AR switch mode 216*e*.

Connection Agent 216*a*: Connection Agent 216*a* initiates a connection to the browsing device 104 once the AR device 102 is triggered to connect to the browsing device 104.

Data Parser 216*b*: Data Parser 216*b* parses data received from the browsing device 104 and fetches the required data to be rendered on the AR device 102.

AR Manager 216*c*: AR Manager 216*c* uses all other sub modules to complete the work.

AR ServerManager 216*d*: AR ServerManager 216*d* communicates with the AR server 106 and receives the final composite image which has to be rendered on the display device 208.

Smart AR switch mode 216*e*: Smart AR switch mode 216*e* is used to enable or disable AR browsing mode.

The eye gaze tracking module 212 is configured to track eye gazes and find coordinates corresponding to the eye gazes on the display 210 in the browsing device 104. The AR server 106 is configured to provide AR content to the AR device 102 based on the eye gaze information of the user. The AR server 106 includes AR software 106*a* and AR toolkit 106*b* to perform various functionalities.

Figure 14:
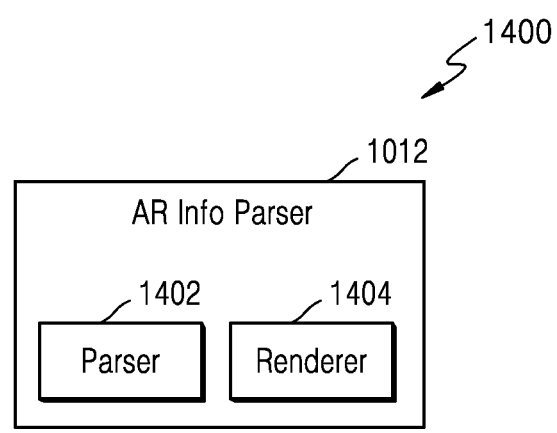
FIG. 14 illustrates a block diagram 1400 depicting an AR Info parser 1012, according to an embodiment of the disclosure.

FIG. 14 illustrates a block diagram 1400 depicting an AR Info parser 1012, according to an embodiment of the disclosure.

Referring to FIG. 14, the AR Info parser 1012 is included in WebCore 1050. The AR Info parser 1012 may include Parser 1402 and Renderer 1404. The AR Info parser 1012 is configured to parse, with Parser 1402, the DOM tree to find and fetch relevant supplementary web page information to be shared. In an embodiment, the AR Info parser 1012 is configured to parse the DOM tree element attributes and extract AR information.

Figure 15:
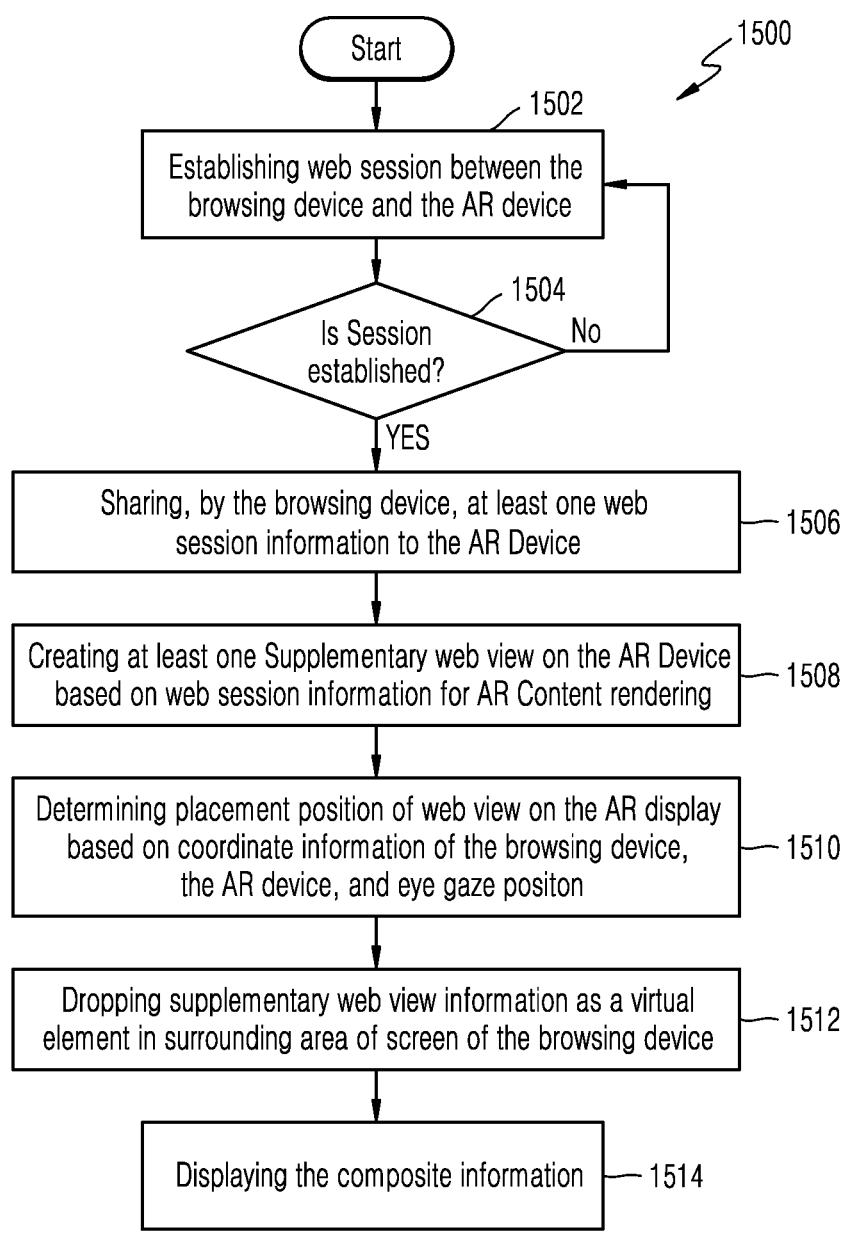
FIG. 15 is a flowchart 1500 illustrating obtaining AR content from a web server, according to an embodiment of the disclosure.

FIG. 15 is a flowchart 1500 illustrating obtaining AR content from a web server, according to an embodiment of the disclosure.

Referring to FIG. 15, in operation 1502, a connection between a browsing device 104 and an AR device 102 is established. In an embodiment, a processor 204 is configured to establish a connection between the browsing device 104 and the AR device 102. In operation 1504, the processor 204 may check whether the connection is established. If the connection is not established, the processor 204 again tries to establish the connection. In operation 1506, if the connection is established, the browsing device 104 may share at least one web session information with the AR device 102. In operation 1508, at least one supplementary web view on the AR device 102 is generated based on web session information for rendering AR content. In an embodiment, a WebAR module 214 or the processor 204 is configured to create at least one supplementary web view on the AR device 102 based on web session information for rendering AR content. In operation 1510, placement position of web view on a display device 208 is determined based on coordinate information of the browsing device 104, the AR device 102, and eye gaze position. In an embodiment, the SmartAR module 216 or the processor 204 is configured to determine placement position of web view on a display device 208 based on coordinate information of the browsing device 104, the AR device 102, and eye gaze position. In operation 1512, the supplementary web view information as a virtual element in surrounding area of screen of the browsing device 104 is dropped or rendered. In an embodiment, the AR server 106 is configured to drop or render supplementary web view information as a virtual element in surrounding area of screen of the browsing device 104. In operation 1514, displaying the composite information is displayed. In an embodiment, the AR device 102 is configured to display the composite information.

Figure 16:
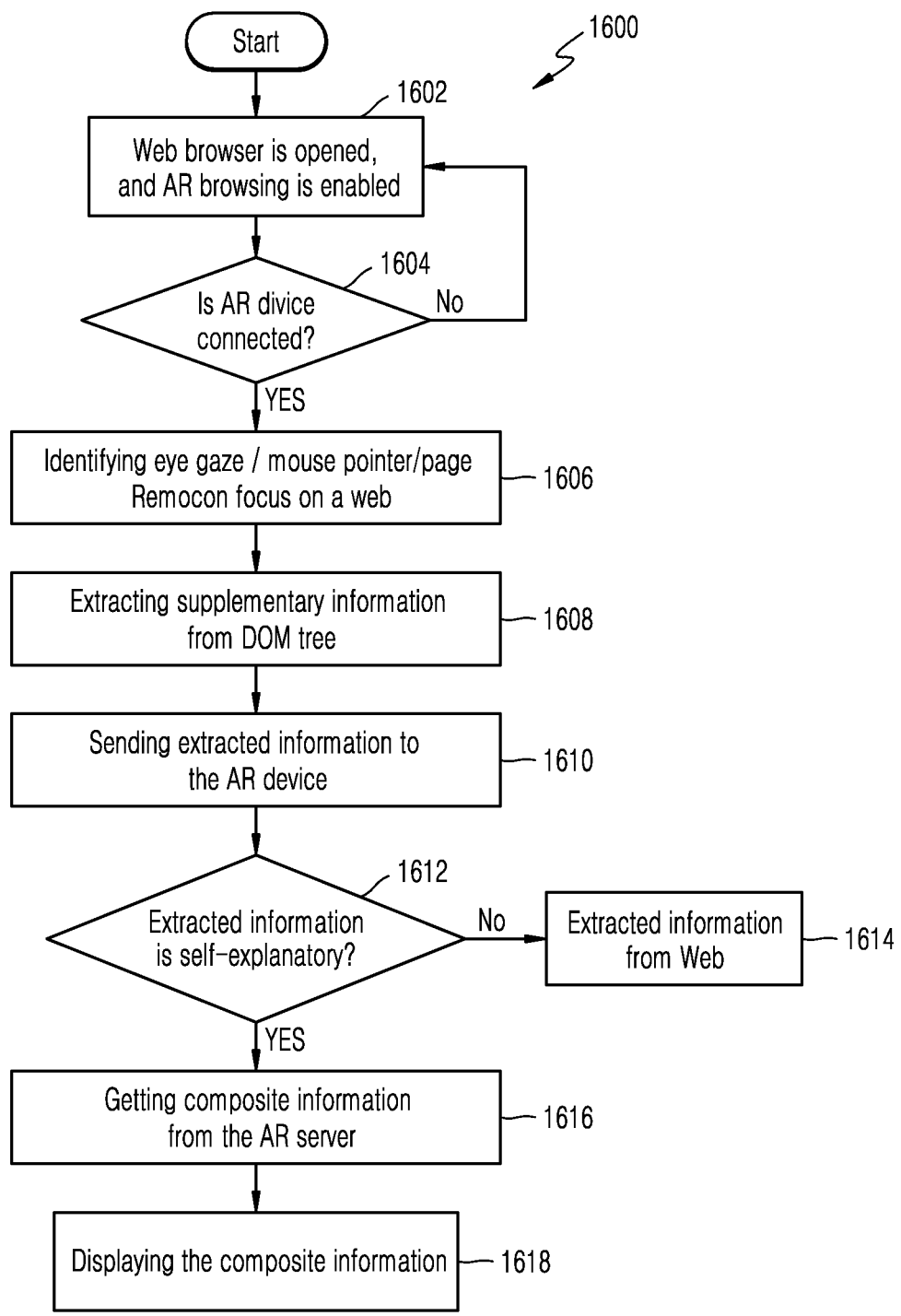
FIG. 16 illustrates a flowchart 1600 of using a webpage element as supplementary information, according to an embodiment of the disclosure.

FIG. 16 illustrates a flowchart 1600 of using a webpage element as supplementary information, according to an embodiment of the disclosure.

Referring to FIG. 16, in operation 1602, a web browser is opened on a browsing device 104, and AR browsing is enabled. In operation 1604, it is checked whether the AR device 102 is connected to the browsing device 104. In an embodiment, a processor 204 is configured to check whether the AR device 102 is connected to the browsing device 104. In operation 1606, the eye gaze, a mouse pointer, or a remocon focus on a webpage is identified. In an embodiment, an eye gaze tracking module 212 or the processor 204 is configured to identify eye gaze information of the user. In operation 1608, supplementary information from DOM tree is extracted. In an embodiment, an AR server 106 is configured to extract supplementary information from DOM tree. In operation 1610, the AR server 106 is configured to send the extracted information to the AR device 102. In operation 1612, it is checked whether the extracted information is self-explanatory. If the extracted information is not self-explanatory, information from a webpage is further extracted in operation 1614. If the extracted information is self-explanatory, composite information from the AR server 106 is obtained in operation 1616. In operation 1618, the composite information is displayed. In an embodiment, the display device 208 is configured to display the composite information.

Figure 17:
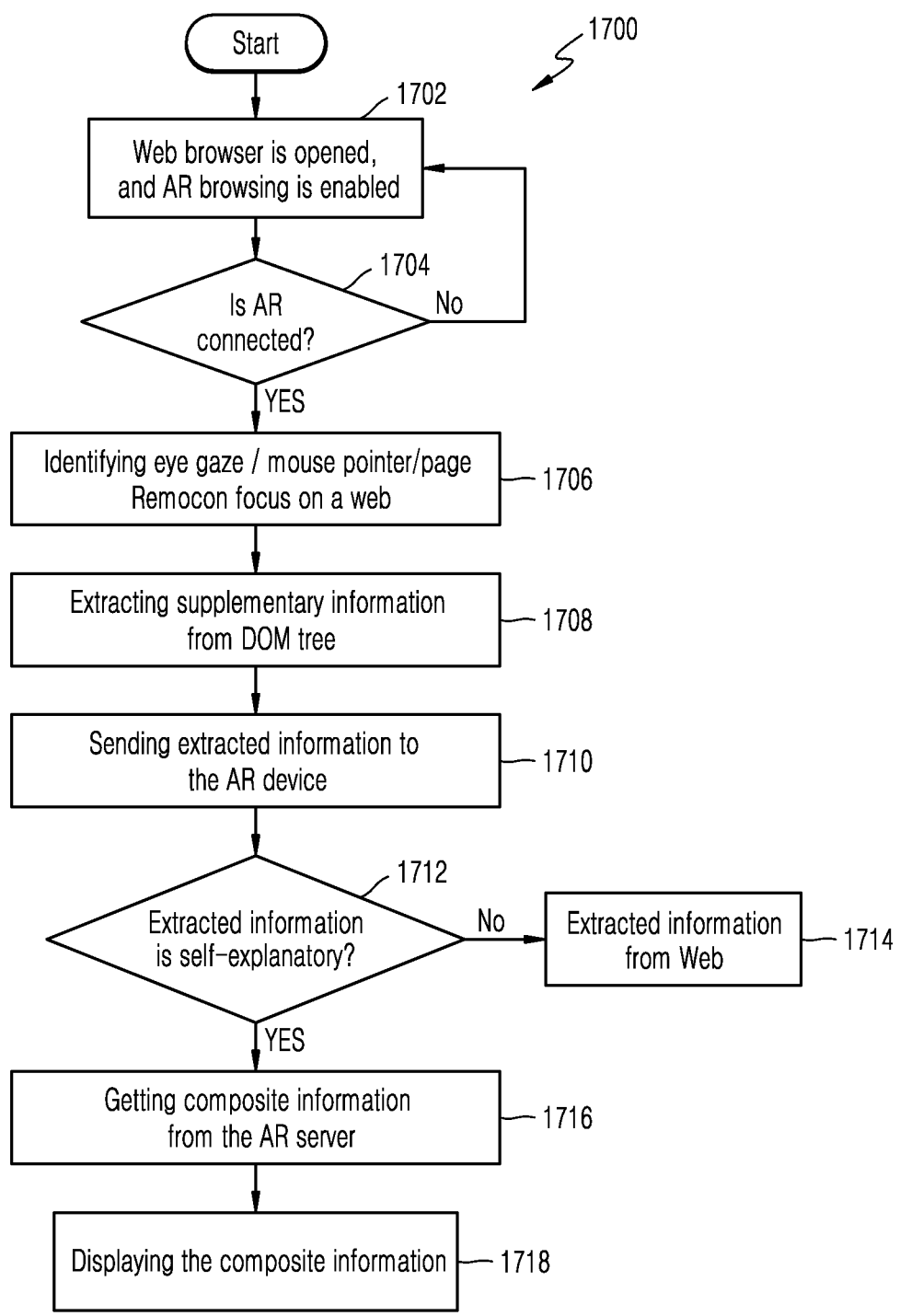
FIG. 17 illustrates a flowchart 1700 of using browser UI as supplementary information, according to an embodiment of the disclosure.

FIG. 17 illustrates a flowchart 1700 of using browser UI as supplementary information, according to an embodiment of the disclosure.

Referring to FIG. 17, in operation 1702, a web browser is opened on a browsing device 104 and AR browsing is enabled. In operation 1704, a processor 204 is configured to check whether the AR device 102 is connected to the browsing device 104. In operation 1706, the eye gaze, a mouse pointer, or a remocon focus on a web browser UI is identified. In an embodiment, an eye gaze tracking module 212 or the processor 204 is configured to identify eye gaze information of the user. In operation 1708, supplementary information from the web browser UI is extracted. In an embodiment, an AR server 106 is configured to extract supplementary information from the web browser UI. In operation 1710, the extracted information is transmitted to the AR device 102. In an embodiment, the AR server 106 is configured to send extracted information to the AR device 102. In operation 1712, it is checked whether the extracted information is self-explanatory. If the extracted information is not self-explanatory, information from web page is extracted in operation 1714. If the extracted information is self-explanatory, composite information from the AR server 106 is obtained in operation 1716. In operation 1718, the composite information is displayed. In an embodiment, the display device 208 is configured to display the composite information.

Figure 18:
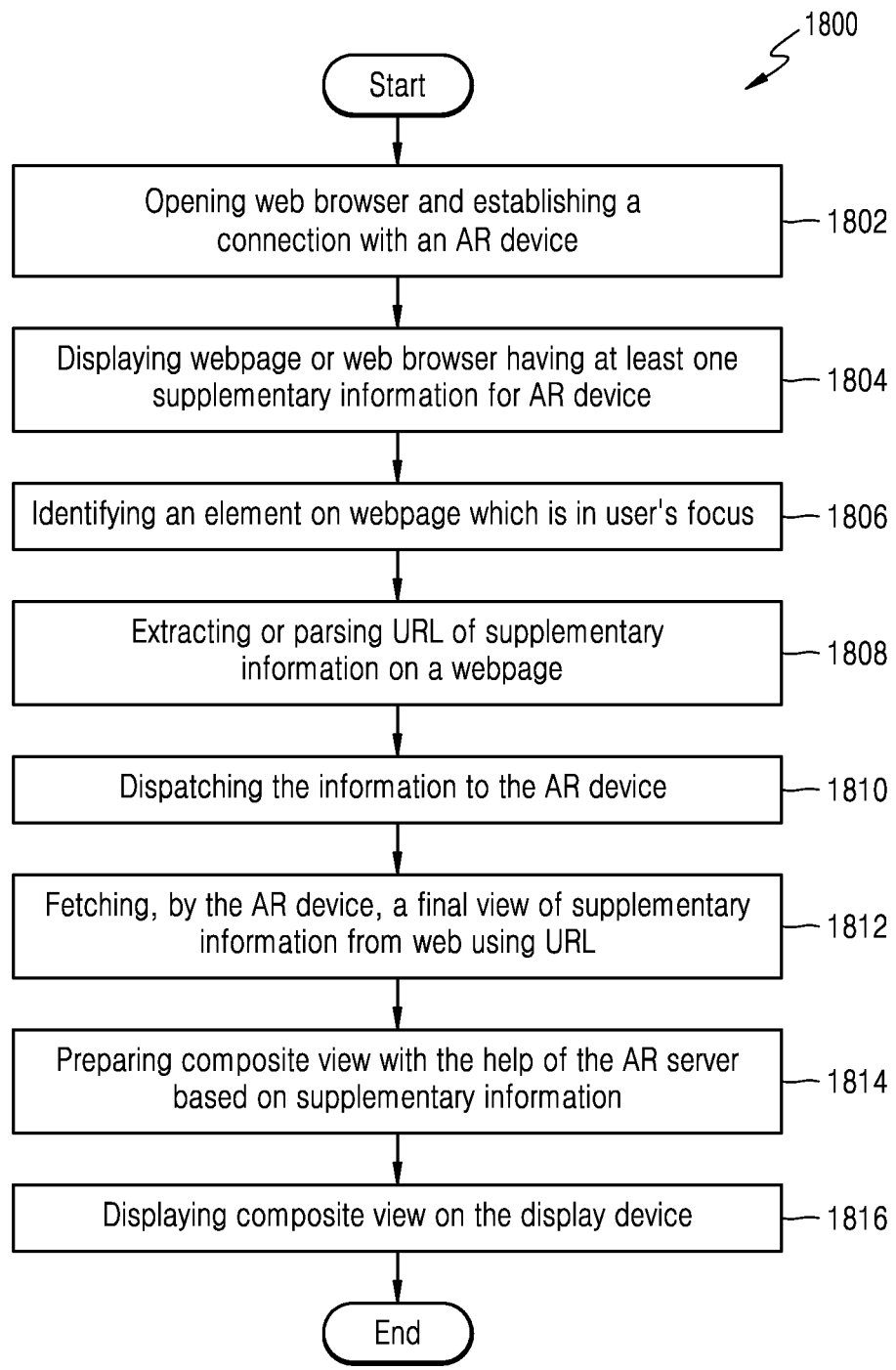
FIG. 18 illustrates a flowchart 1800 of displaying a webpage element supplementary information using a URL, according to an embodiment of the disclosure.

FIG. 18 illustrates a flowchart 1800 of displaying webpage element supplementary information using a URL, according to an embodiment of the disclosure.

Referring to FIG. 18, in operation 1802, a web browser is opened and a connection with an AR device 102 is established. In an embodiment, a web browser is opened on a browsing device 102. In another embodiment, a processor 204 is configured to establish a connection between the browsing device 104 and the AR device 102. In operation 1804, a webpage or web browser having at least one supplementary information for the AR device 102 is displayed. In an embodiment, a display 210 associated with the browsing device 104 displays a webpage or a web browser having at least one supplementary information for the AR device 102. In operation 1806, an element on a webpage which is in user's focus is identified. In an embodiment, an eye gaze tracking module 212 is configured to identify an element on a webpage which is in user's focus. In operation 1808, a URL of supplementary information on webpage is extracted or parsed. In an embodiment, the web server 108 is configured to extract or parse the URL of supplementary information on webpage. In operation 1810, the information is dispatched to the AR device 102. In an embodiment, the AR server 106 is configured to fetch the information from the web server 108 and then dispatch the information to the AR device 102. In operation 1812, the AR device 102 fetches a final view of supplementary information from web using the URL. In an embodiment, the AR device 102 is configured to fetch a final view of supplementary information from web using URL. In operation 1814, a composite view with the help of the AR server is prepared 106 based on the supplementary information. In an embodiment, the AR device 102 is configured to prepare a composite view with the help of the AR server 106 based on the supplementary information. In operation 1816, a composite view is displayed on a display device 208. In an embodiment, the AR device 102 is configured to display the composite view on the display device 208.

Figure 19:
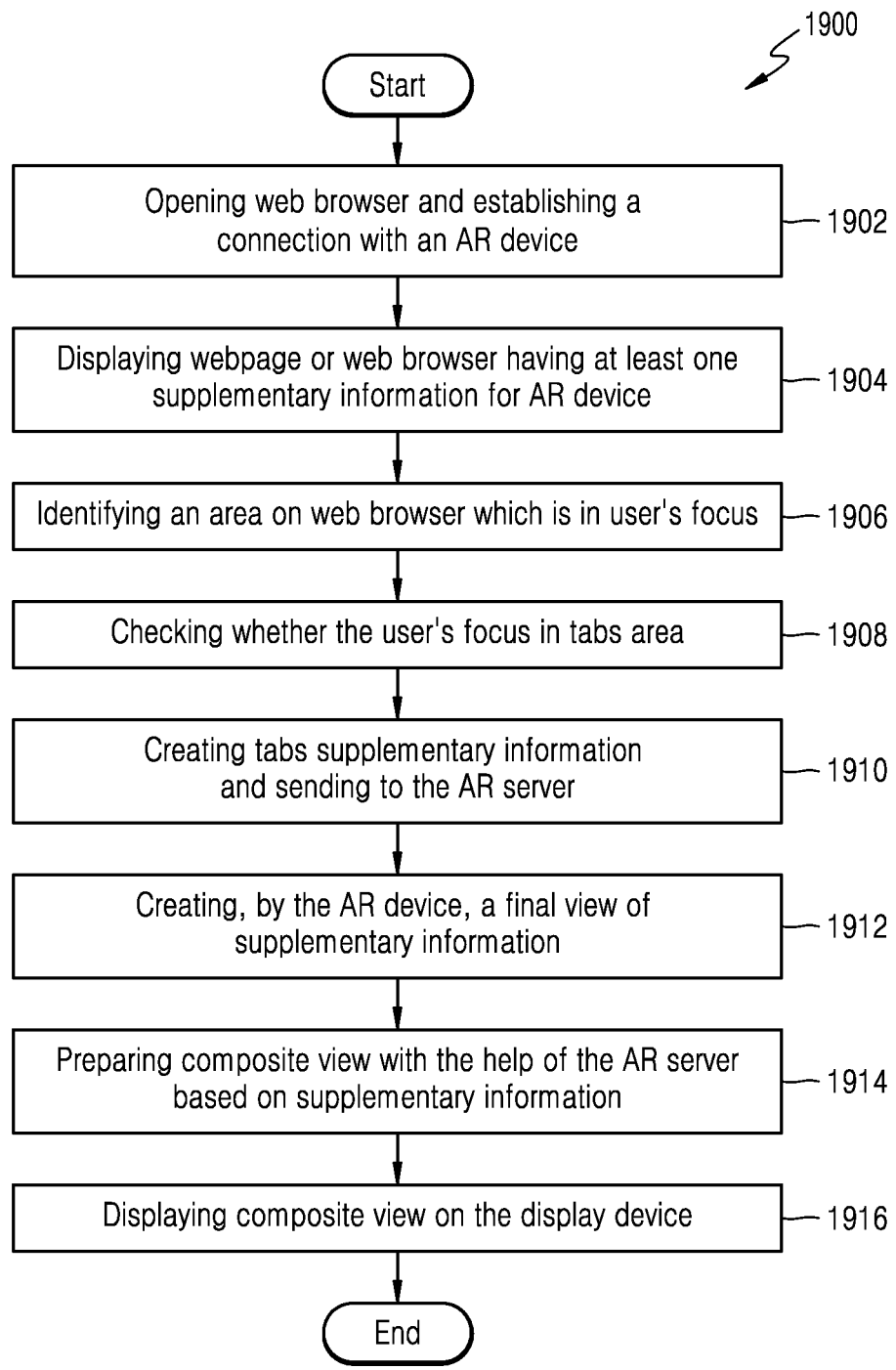
FIG. 19 illustrates a flowchart 1900 of displaying a web browser tab view supplementary information, according to an embodiment of the disclosure.

FIG. 19 illustrates a flowchart 1900 of displaying a web browser tab view supplementary information, according to an embodiment of the disclosure.

Referring to FIG. 19, in operation 1902, a web browser is opened and a connection with an AR device 102 is established. In an embodiment, a web browser is opened on a browsing device 104. In another embodiment, a processor 204 is configured to establish a connection between the browsing device 104 and the AR device 102. In operation 1904, a webpage or a web browser having at least one supplementary information for the AR device 102 is displayed. In an embodiment, a display 210 associated with the browsing device 104 displays a webpage or a web browser having at least one supplementary information for the AR device 102. In operation 1906, an eye gaze tracking module 212 is configured to identify area on a web browser UI which is in user's focus. In operation 1908, the eye gaze tracking module 212 is configured to check whether user's focus on tabs area. In operation 1910, the web server 108 is configured to create tabs supplementary information and send the tabs supplementary information to the AR server 106. In operation 1912, the AR device 102 is configured to create a final view of supplementary information. In operation 1914, the AR device is configured to prepare composite view with the help of the AR server 106 based on the supplementary information. In operation 1916, the AR device 102 is configured to display the composite view on the display device 208.

Figure 20:
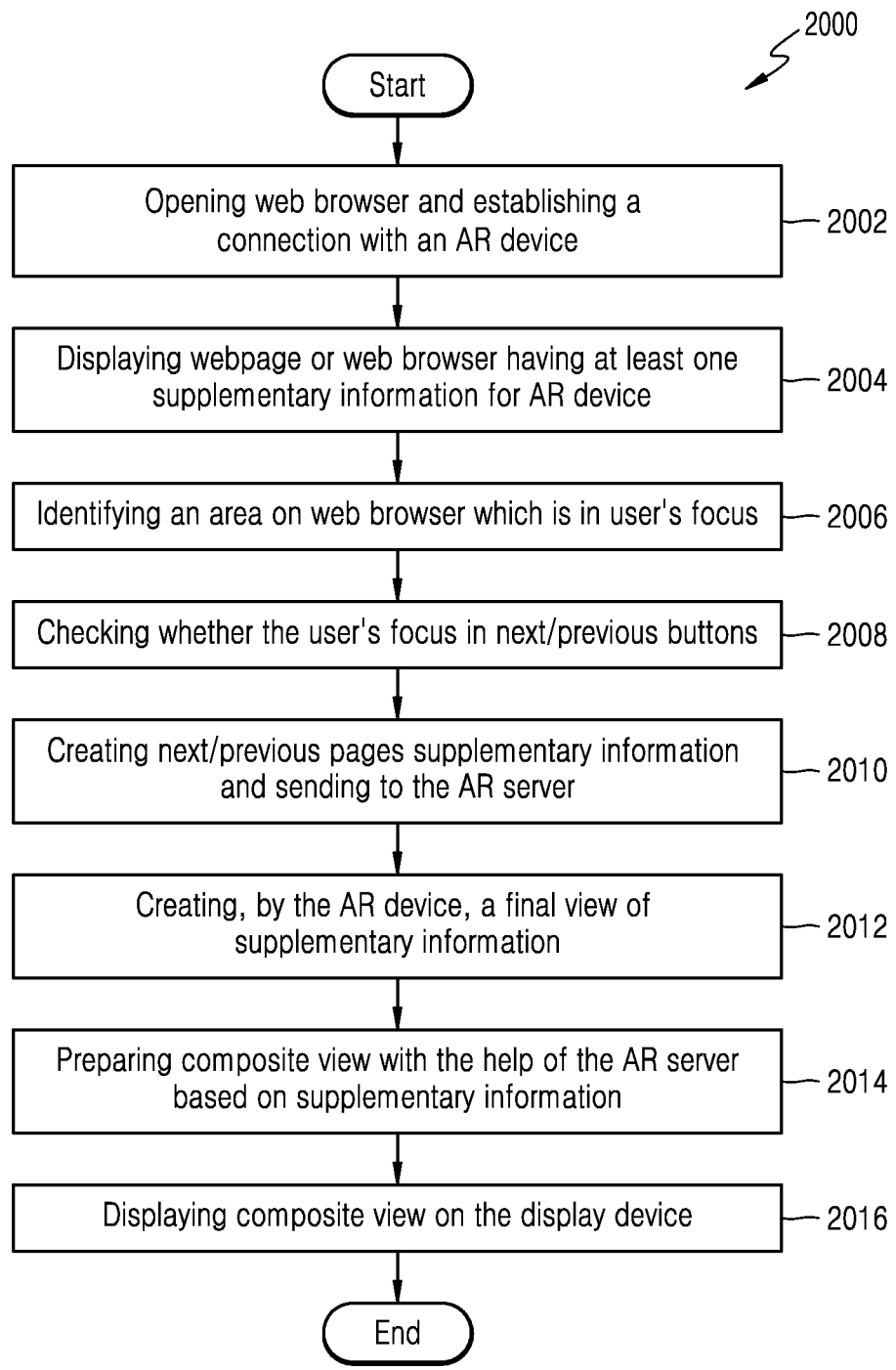
FIG. 20 illustrates a flowchart 2000 of displaying a web browser next/previous view supplementary information, according to an embodiment of the disclosure.

FIG. 20 illustrates a flowchart 2000 of displaying a web browser with next/previous view supplementary information, according to an embodiment of the disclosure.

Referring to FIG. 20, in operation 2002, a web browser is opened on a browsing device 104. In another embodiment, a processor 204 is configured to establish a connection between the browsing device 104 and the AR device 102. In operation 2004, a display 210 associated with the browsing device 104 displays a webpage or a web browser having at least one supplementary information for the AR device 102. In operation 2006, an eye gaze tracking module 212 is configured to identify area on a web browser UI which is in user's focus. In operation 2008, the eye gaze tracking module 212 or the processor 204 is configured to check whether the user's focus is positioned on the next or previous buttons. In operation 2010, the web server 108 is configured to create next/previous pages supplementary information and send the next/previous pages supplementary information to the AR server 106. In operation 2012, the AR device 102 is configured to create a final view of supplementary information. In operation 2014, the AR device is configured to prepare a composite view with the help of the AR server 106 based on the supplementary information. In operation 2016, the AR device 102 is configured to display the composite view on the display device 208.

FIG. 21 illustrates a flowchart 2100 of displaying a web browser with a scroll free webpage mode, according to an embodiment of the disclosure.

Referring to FIG. 21, in operation 2002, a web browser is opened and a connection with an AR device 102 is established. In an embodiment, a web browser is opened on a browsing device 102. In another embodiment, a processor 204 is configured to establish a connection between the browsing device 104 and the AR device 102. In operation 2104, a display 210 associated with the browsing device 104 displays a webpage or a web browser having at least one supplementary information for the AR device 102. In operation 2106, an eye gaze tracking module 212 is configured to identify area on a web browser UI which is in user's focus. In operation 2108, the eye gaze tracking module 212 is configured to check whether user's focus is positioned on horizontal scroll bar buttons. In operation 2110, the web server 108 is configured to create webpages supplementary information which is hidden due to the scroll bar and send the webpages supplementary information to the AR server 106. In operation 2112, the AR device 102 is configured to create final view of supplementary information. In operation 2114, the AR device 102 is configured to prepare a composite view with the help of the AR server 106 based on the supplementary information. In operation 2116, the AR device 102 is configured to display the composite view on the display device 208.

FIG. 22 illustrates a flowchart 2200 if displaying a webpage password as supplementary information, according to an embodiment of the disclosure.

Referring to FIG. 22, in operation 2202, a web browser is opened and a connection with an AR device 102 is established. In an embodiment, a web browser is opened on a browsing device 104. In another embodiment, a processor 204 is configured to establish a connection between the browsing device 104 and the AR device 102. In operation 2204, a display 210 associated with the browsing device 104 displays a webpage or a web browser having at least one supplementary information for the AR device 102. In operation 2206, an eye gaze tracking module 212 is configured to identify area on a web browser UI which is in user's focus. In operation 2208, the eye gaze tracking module 212 is configured to check whether user's focus password input field. In operation 2210, the web server 108 is configured to create webpages supplementary information which is hidden due to a scroll bar and send the created webpages supplementary information to the AR server 106. In operation 2212, the AR device 102 is configured to create a final view of supplementary information. In operation 2214, the AR device 102 is configured to prepare a composite view with the help of the AR server 106 based on the supplementary information. In operation 2216, the AR device 102 is configured to display the composite view on the display device 208.

FIG. 23 illustrates a flowchart 2300 of providing multi-view browsing experience in an augmented reality environment, according to an embodiment of the disclosure.

Referring to FIG. 23, in operation 2302, an augmented reality AR device 102 with one or more browsing devices 104 are paired. In an embodiment, a processor 204 is configured to establish a pairing between the augmented reality AR device 102 with one or more browsing devices 104. In operation 2304, the browsing device 104 is configured to request AR enabled webpages from a web server 108. In operation 2306, the web server 108 is configured to provide requested content to the browsing device 104. In operation 2308, the browsing device 104 is configured to provide web session information to the AR device 102. In operation 2310, the AR device 102 is configured to forward the web session information to an AR server 106. In operation 2312, the AR server 106 is configured to fetch AR content from the web server 108. In operation 2314, the AR server 106 is configured to provide the fetched AR content to the AR device 102. In operation 2316, the AR device 102 is configured to display the AR content along with original display based on the content displayed on a display area of the display 210 associated with the browsing device 104.

FIG. 24 illustrates a flowchart 2400 of providing multi-view browsing experience in an augmented reality environment, according to an embodiment of the disclosure.

Referring to FIG. 24, in operation 2402, an AR device 102 and one or more browsing devices 104 are paired. In an embodiment, a processor 204 is configured to establish a pairing between the AR device 102 with one or more browsing devices 104. In operation 2404, the browsing device 104 is configured to provide web session information to the AR device 102. In operation 2406, the AR device 102 is configured to forward the web session information to an AR server. In operation 2408, the AR server 106 is configured to fetch AR content from a web server 108 using web session information. In operation 2410, the AR server 106 is configured to render the fetched AR content to the AR device 102. In operation 2412, the AR device 102 is configured to display the AR content along with original display based on the content displayed on a display 210 associated with the browsing device 104.

FIG. 25 illustrates a flowchart 2500 of providing multi-view browsing experience in an augmented reality environment, according to an embodiment of the disclosure.

Referring to FIG. 25, an AR device 102 and one or more browsing devices 104 are paired. In an embodiment, in operation 2502, a processor 204 is configured to establish a connection between the augmented reality AR device 102 with one or more browsing devices 104. In operation 2504, the processor 204 is configured to provide the AR device information and/or AR server information to the browsing device 104. In operation 2506, the browsing device 104 is configured to provide web session information along with the AR device information and/or the AR server information to a web server 108. In operation 2508, AR content is provided, by the web server 108, to the AR server 106 using the web session information. In operation 2510, the browsing device 104 is configured to provide eye gaze information of a user to the AR device 102. In operation 2512, the AR device 102 is configured to forward the eye gaze information of the user to the AR server 106. In operation 2514, the AR server 106, is configured to the AR content to the AR device 104 based on the eye gaze information of the user. In operation 2516, AR content is displayed, by the AR device 102, along with original display based on the content displayed on a display 210 associated with the browsing device 104.

Figure 26A:
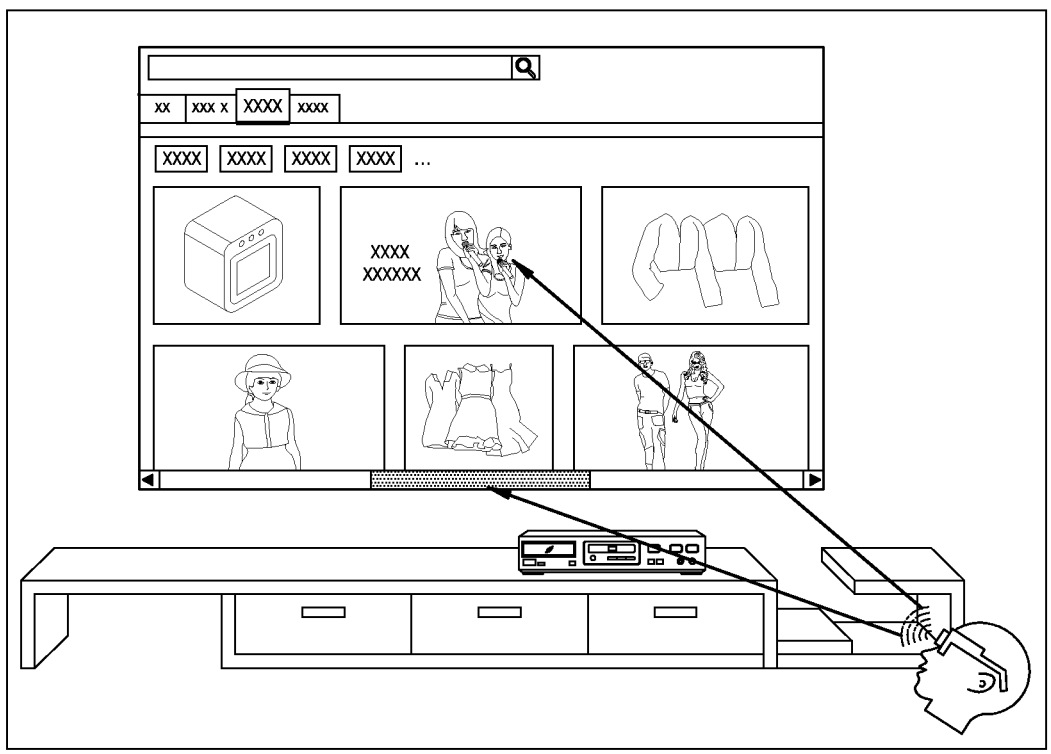
FIGS. 26A and 26B illustrate a use-case scenario depicting horizontal scroll free view in websites, according to various embodiments of the disclosure.
Figure 26B:
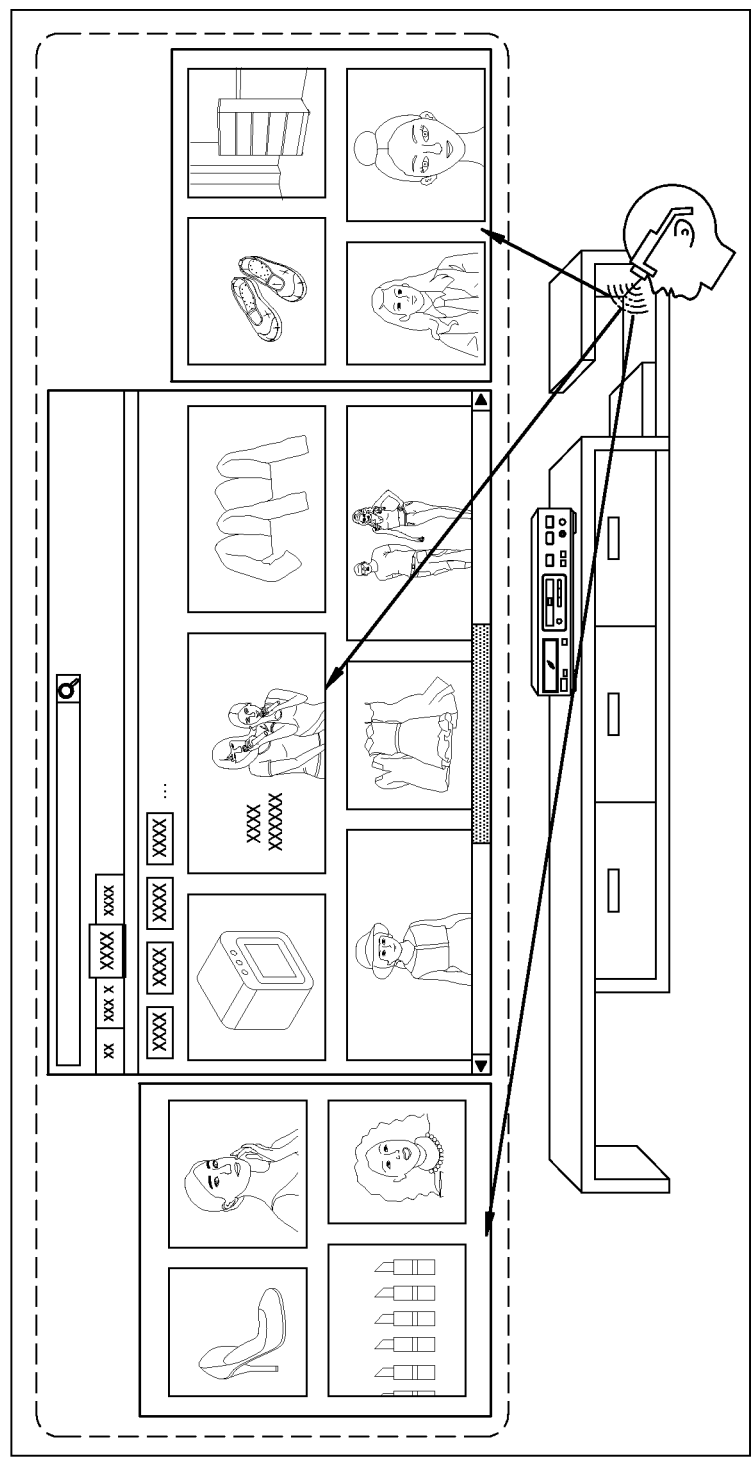

FIGS. 26A and 26B illustrate a use-case scenario depicting horizontal scroll free view in websites, according to various embodiments of the disclosure.

Referring to FIG. 26A, in this scenario, when a webpage has very long horizontal width, a horizontal scroll bar is used to navigate the horizontally for completely viewing the whole webpage content. Referring to FIG. 26A, the current view port of the webpage does not cover the whole web page content and thus the horizontal scroll bar is enabled.

Referring to FIG. 26B, the AR plane is enabled. The user can view the whole webpage without scrolling the horizontal scroll bar. In addition, the user can perform interaction e.g. copy/select/click with the webpage content shown in the AR plane through a mouse or other means of interaction device such as a remote controller or an AR eye gaze.

FIGS. 27A, 27B, 27C, and 27D illustrate a use-case scenario depicting a preview of a browser navigation bar on a display device with back/forward tabs, according to various embodiments of the disclosure.

Often times, a browser navigates web pages through links of the webpage and the user may click numerous links to open related sites. The user may open webpages with tabs so that he or she may view relevant information or relevant webpages quickly. But the user experience is not so as smooth, because the user has to click the backward button or the forward button multiple times to reach desire location. Similarly, the user has to check each tab by clicking the tabs.

Figure 27A:
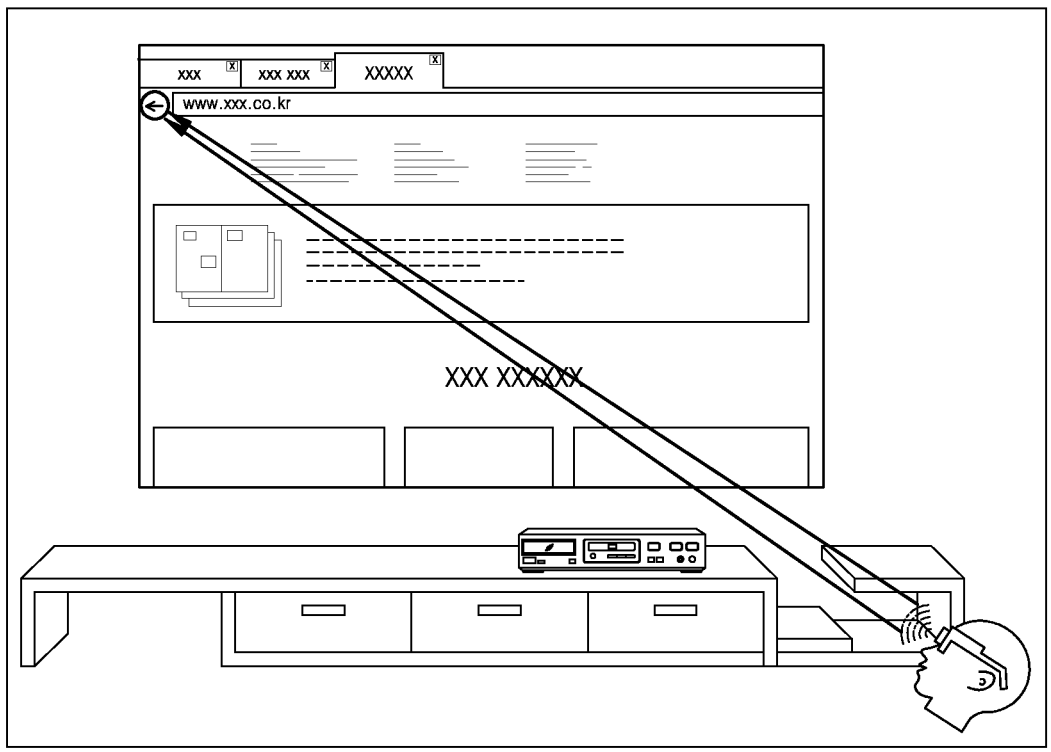
FIGS. 27A, 27B, 27C, and 27D illustrate a use-case scenario depicting a preview of a browser navigation bar on a display device with back/forward tabs, according to various embodiments of the disclosure.

Referring to FIG. 27A, the webpages associated with Backward/Forward buttons in AR plane are shown. The user may move to a webpage by viewing the backward button on the current webpage.

Figure 27B:
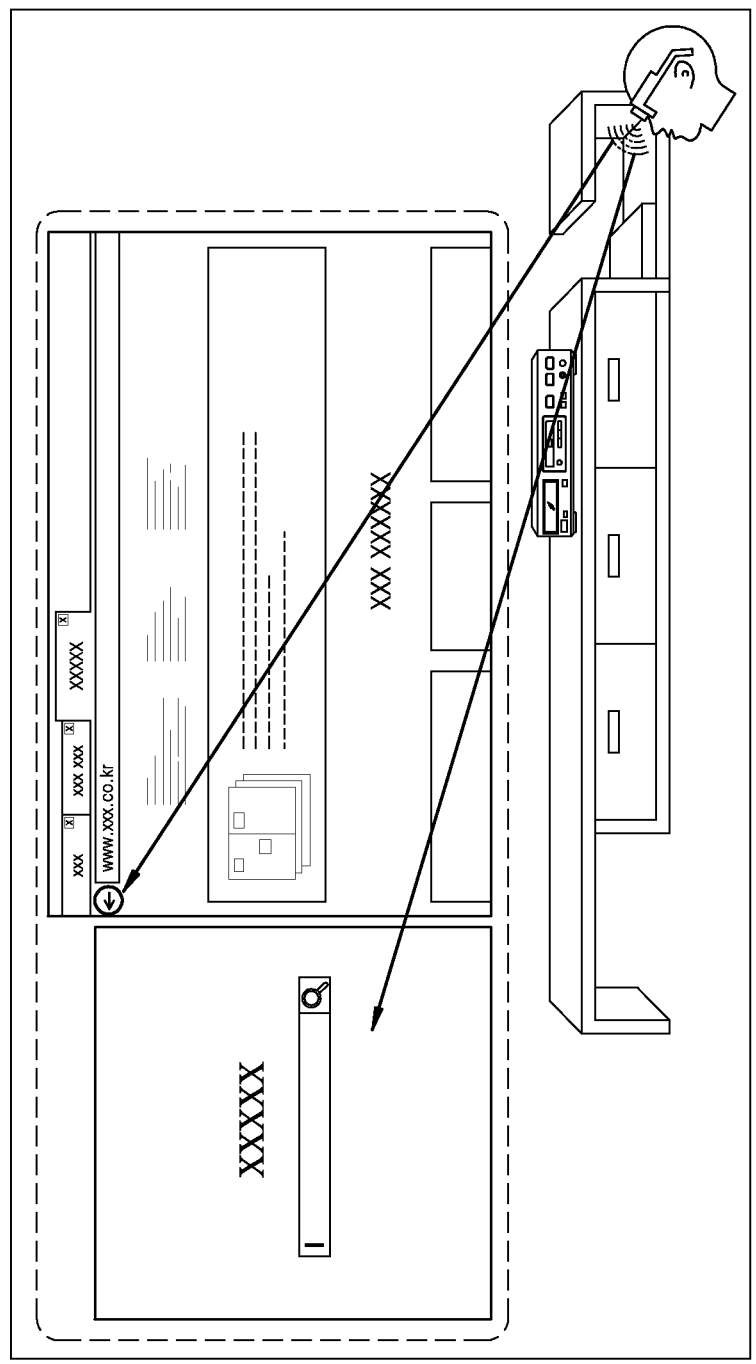

Referring to FIG. 27B, the webpage opened by activating the backward button is displayed in the AR plane.

Figure 27C:
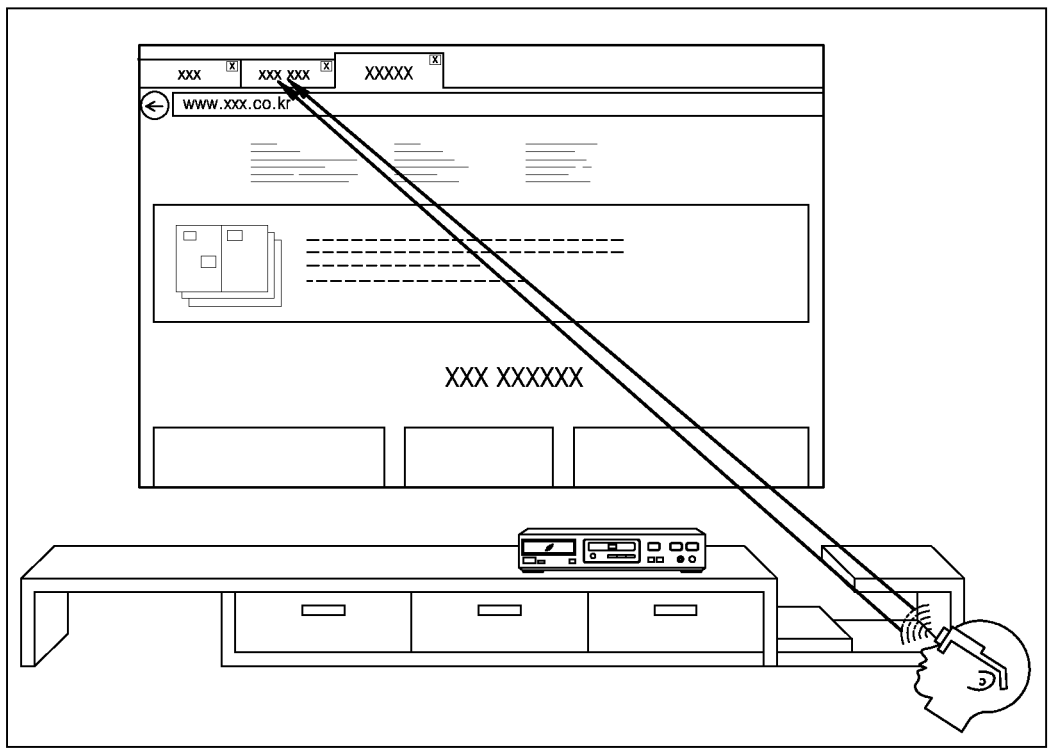

Referring to FIG. 27C, the tab button is activated via an AR device 102 in the AR plane.

Figure 27D:
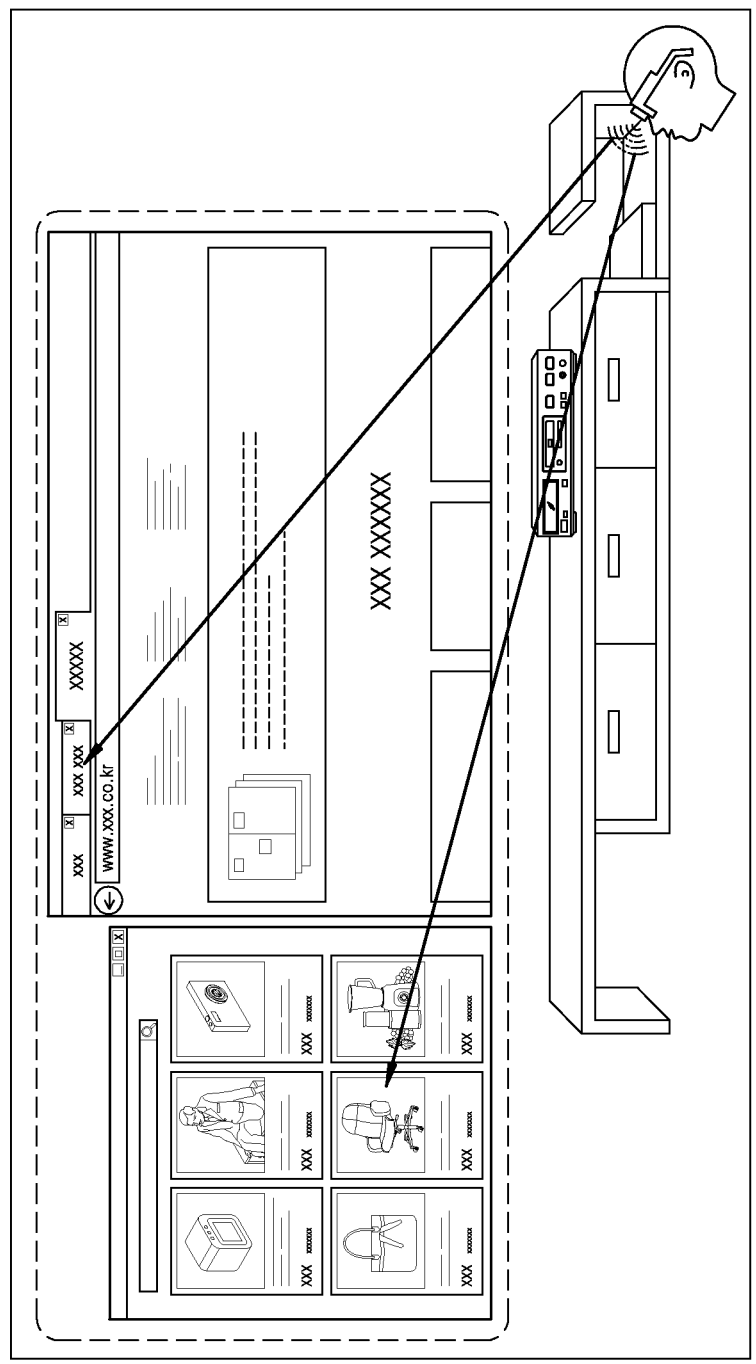

Referring to FIG. 27D, the webpages associated with the tab button is displayed in the AR plane.

FIGS. 28A, 28B, 28C, and 28D illustrate a use-case scenario depicting a hyperlink preview on an AR device, according to various embodiments of the disclosure.

Usually while viewing some webpages, a user may read some hyperlinks, click the hyperlink to view complete information, and go back to the previous page if the information opened with the hyperlink is determined to be not relevant. This process exhausts lot of time due to useless browsing. Therefore, the system 100 enhances user browsing experiences using AR device 102. While browsing a webpage using a front camera of the AR device 102, a user eye gaze can be identified and based on the user eye focus related to the user eye gaze a webpage opened with the relevant hyperlink can be shown on the AR view.

Figure 28A:
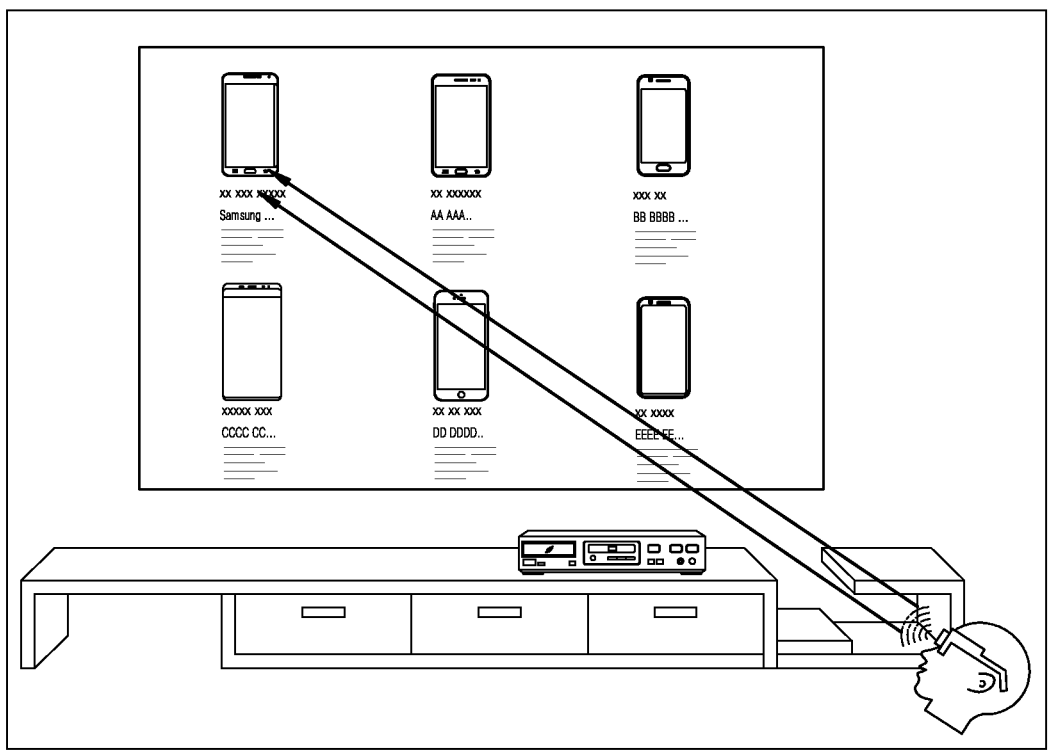
FIGS. 28A, 28B, 28C, and 28D illustrate a use-case scenario depicting a hyperlink preview on an AR device, according to various embodiments of the disclosure.

Referring to FIG. 28A, the user is browsing while wearing AR glasses. The user eye gaze is recognized using a device camera of the AR glasses and the browsing device shares the hyperlink on which user is focused with the AR glasses—the AR device 102. The AR device 102 communicates the same hyperlink with the AR server 106 to obtain composite image for an AR view. The AR server 106 fetches the webpage associated with the hyperlink from the web server 108 and sends composite image to AR device 102.

Figure 28B:
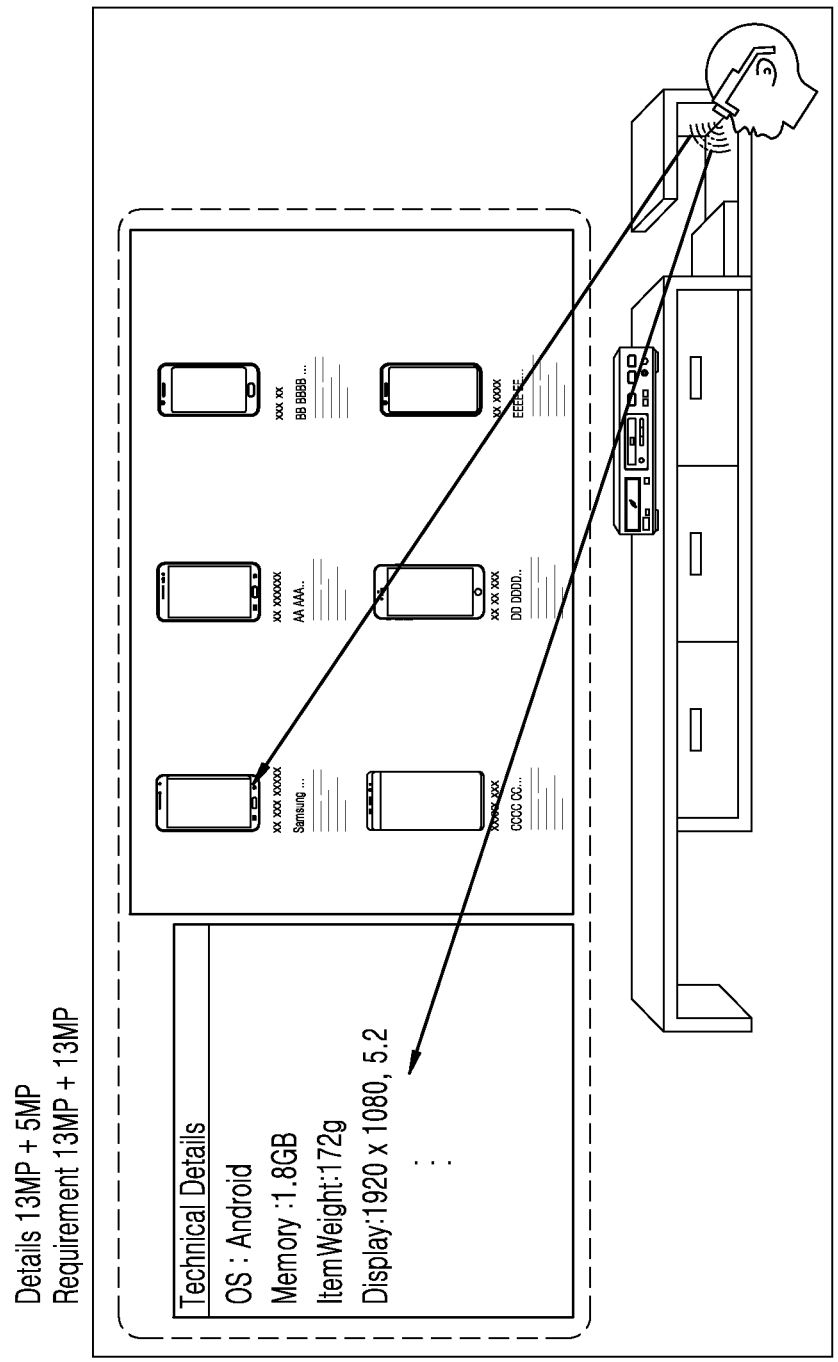

Referring to FIG. 28B, a final AR view is displayed on an AR plane.

Figure 28C:
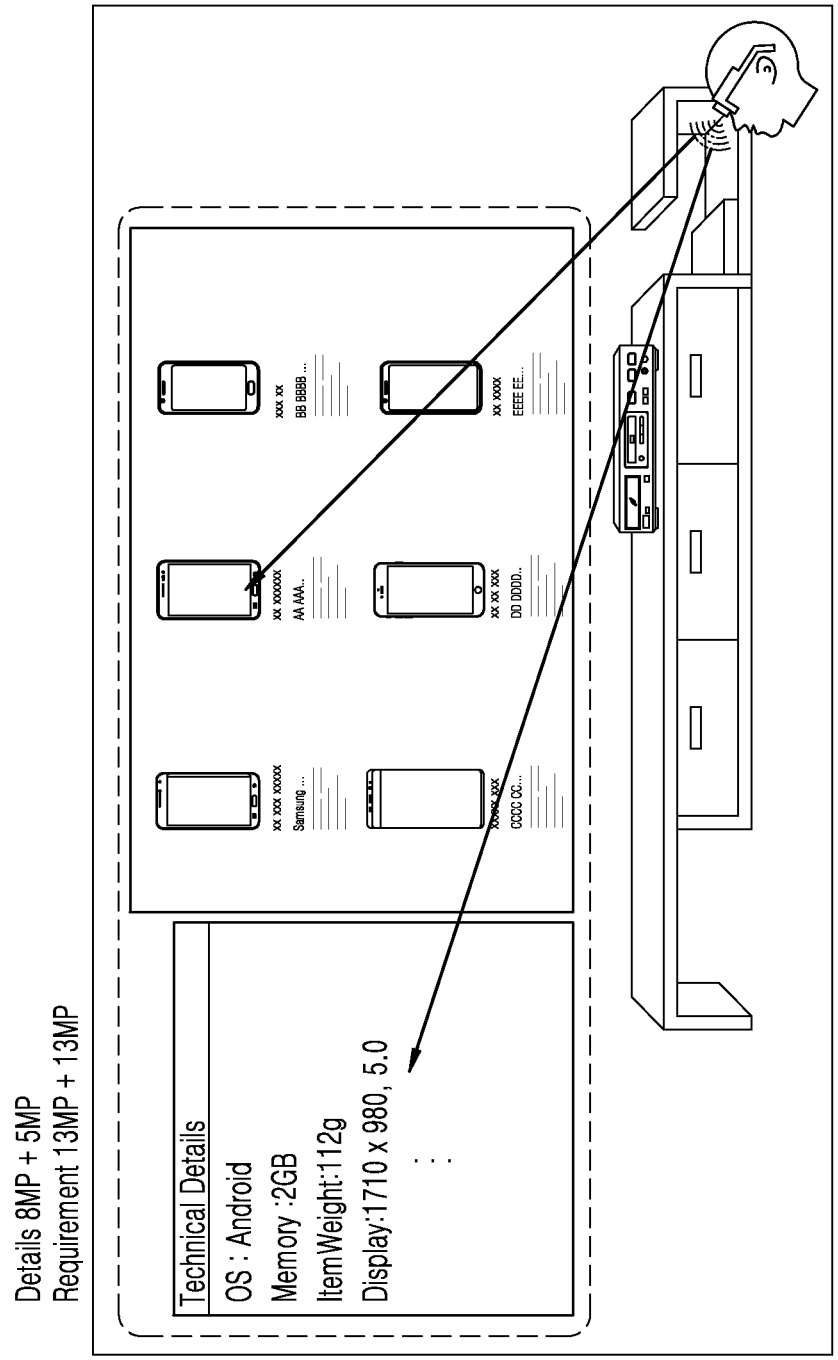
Figure 28D:
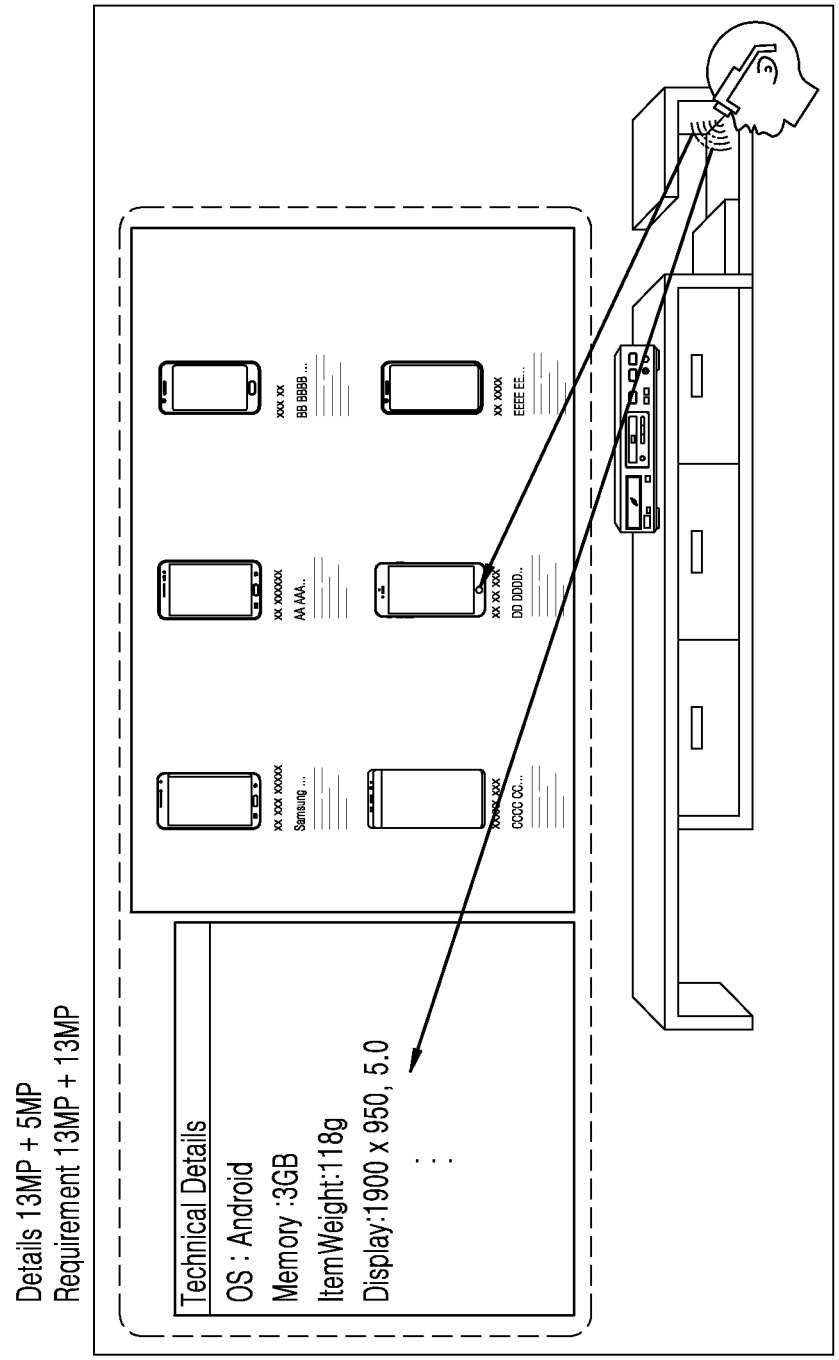

Referring to FIGS. 28C and 28D show an AR view after the user eye gaze focus is stabilized in different cases. When a link preview is shown on AR glasses based on user eye gaze, the user eye gaze will move to a preview which is outside the device screen. To solve this problem, once the preview is shown, it will keep on showing until user eye gaze is focused on another link.

Figure 29A:
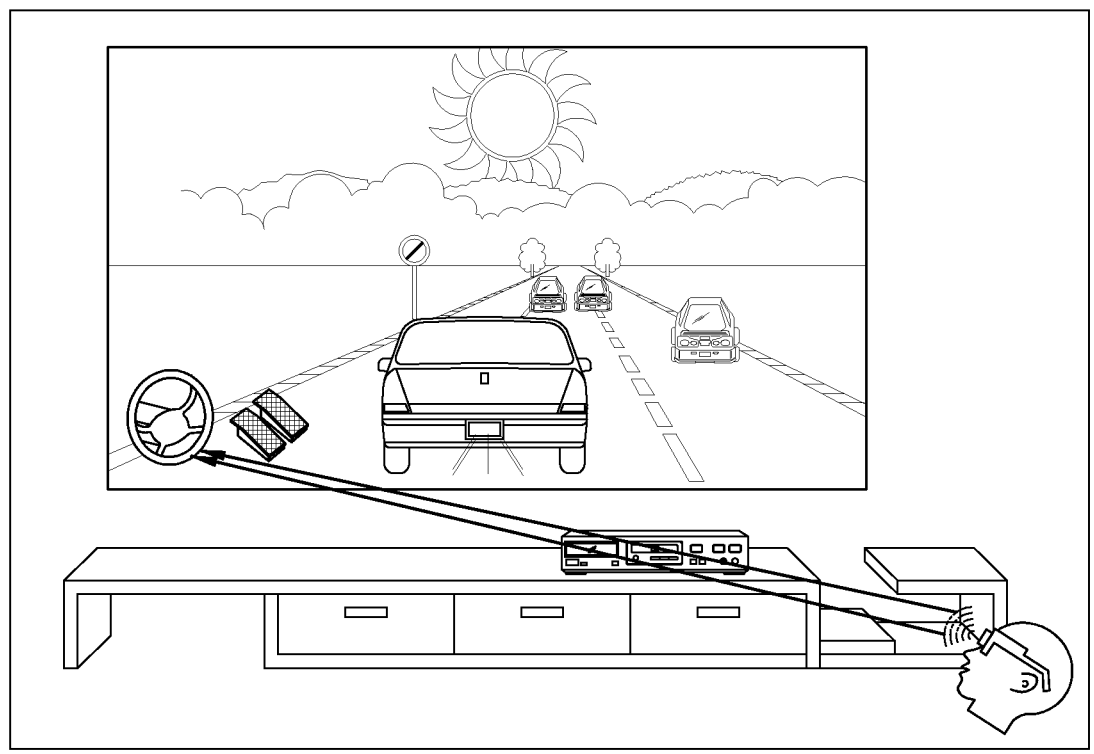
FIGS. 29A and 29B illustrate a use-case scenario depicting displaying controls of games or videos on an AR device, according to various embodiments of the disclosure.
Figure 29B:
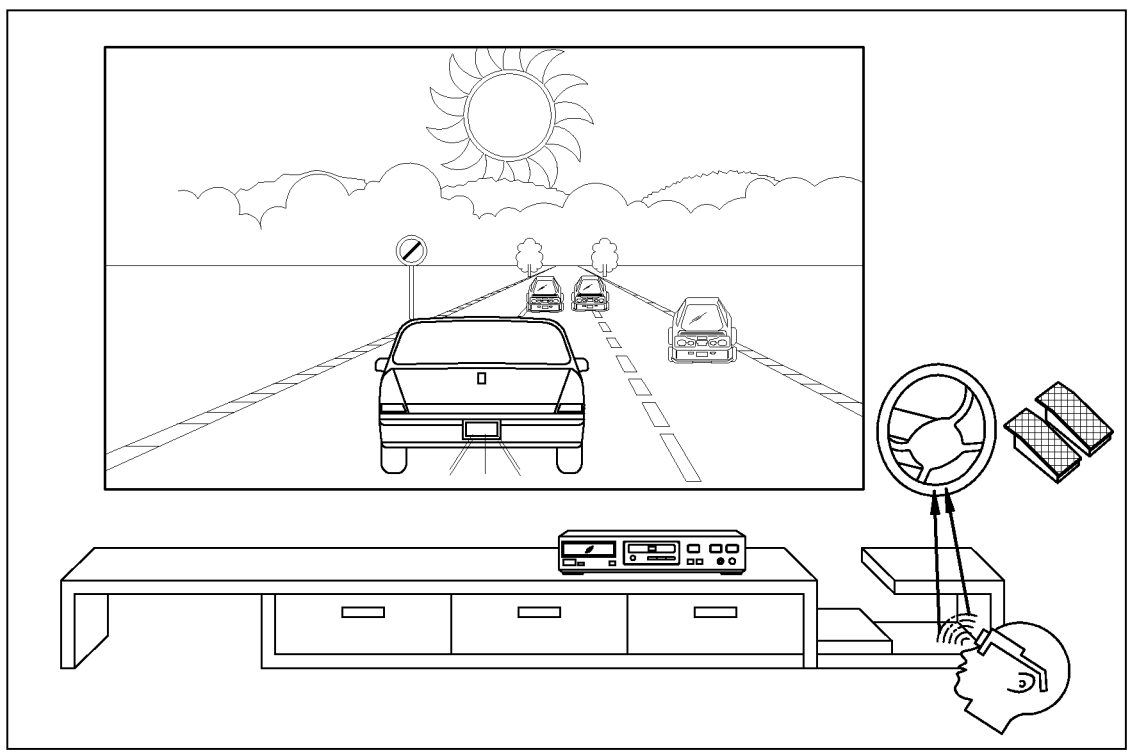

FIGS. 29A and 29B illustrate a use-case scenario depicting displaying controls of games or videos on an AR device, according to various embodiments of the disclosure.

Referring to FIG. 29A, graphical control means of games may obstruct a complete view of game scenes.

Referring to FIG. 29B, the graphical control means of games can be rendered on a separate AR plane with AR glasses. Thereafter, the AR device 102 can share control information using gesture inputs of user with the device so that device can act accordingly.

Figure 30A:
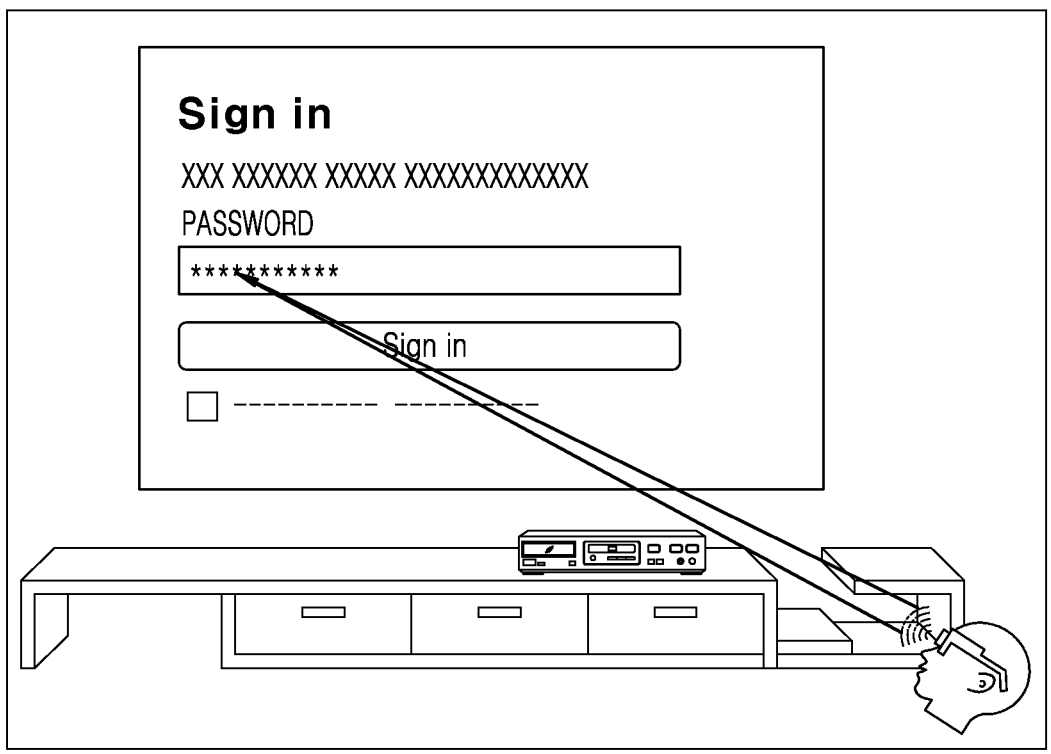
FIGS. 30A and 30B illustrate a use-case scenario illustrating a login process by entering a password on a webpage, according to various embodiments of the disclosure.
Figure 30B:
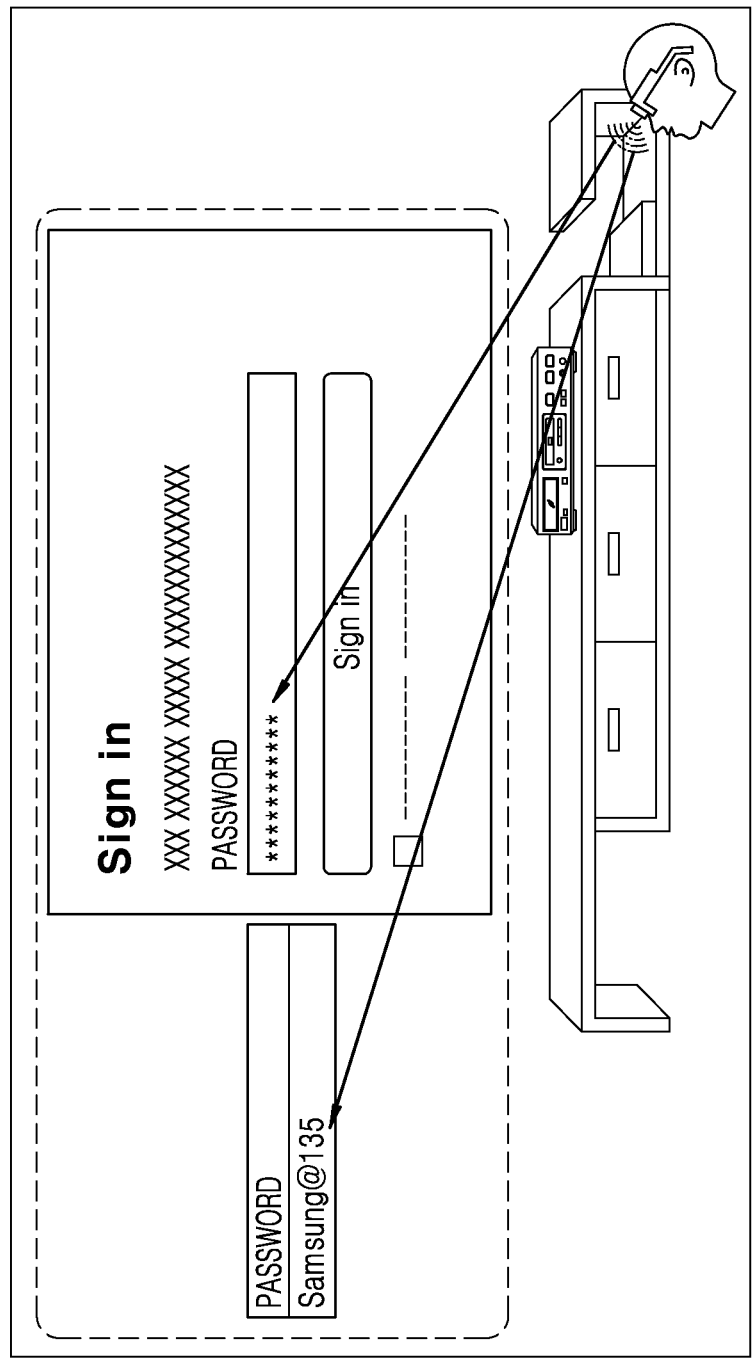

FIGS. 30A and 30B illustrate a use-case scenario depicting a login process by entering a password on a webpage, according to various embodiments of the disclosure.

When a user is entering password on a webpage while the user's eyes are focused on a screen, the user may enter a wrong password and thus a complete login process is repeated.

Referring to FIG. 30A, the system 100 displays the password entered in an AR view which only the user can see. The user is trying to enter a password on the web page. Once browsing device identifies that the user is trying to enter the password with focusing on the password field the device transmits the type of information to the AR device 102—the AR glasses.

Referring to FIG. 30B, the AR glasses may obtain the password entered by the user and create a composite image in which user can see the actual password on the side view. The user can see the composite AR view till password field is in focus.

Figure 31A:
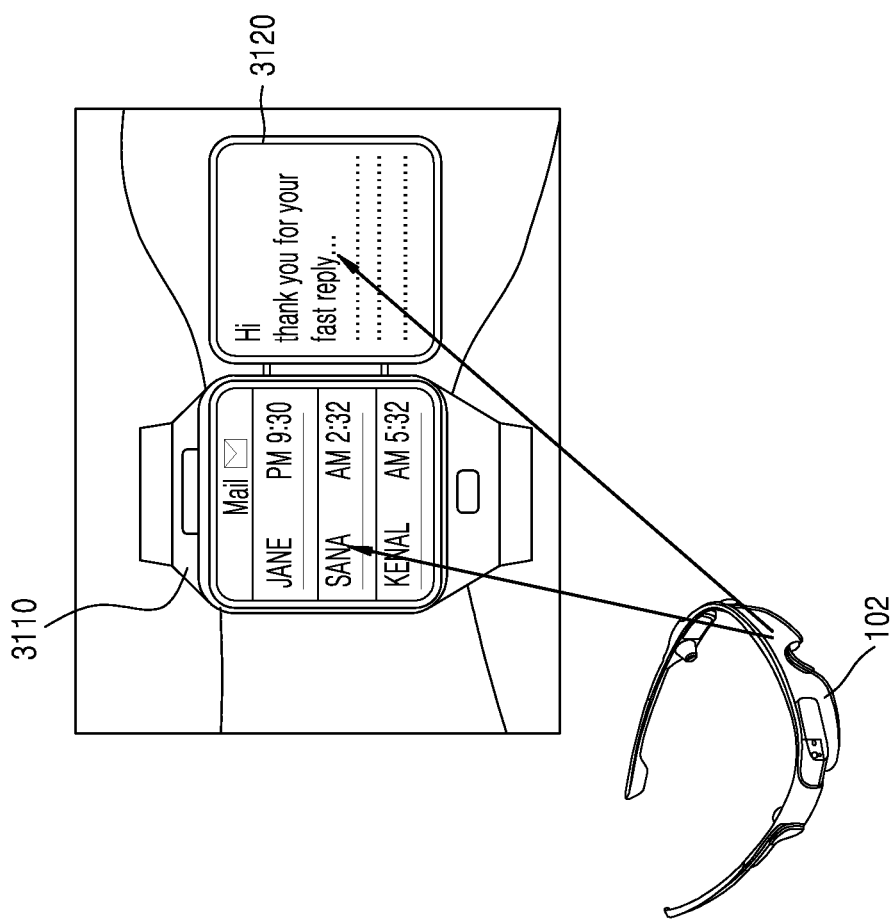
FIGS. 31A and 31B illustrate a use-case scenario illustrating displaying email on an AR device, according to various embodiments of the disclosure.
Figure 31B:
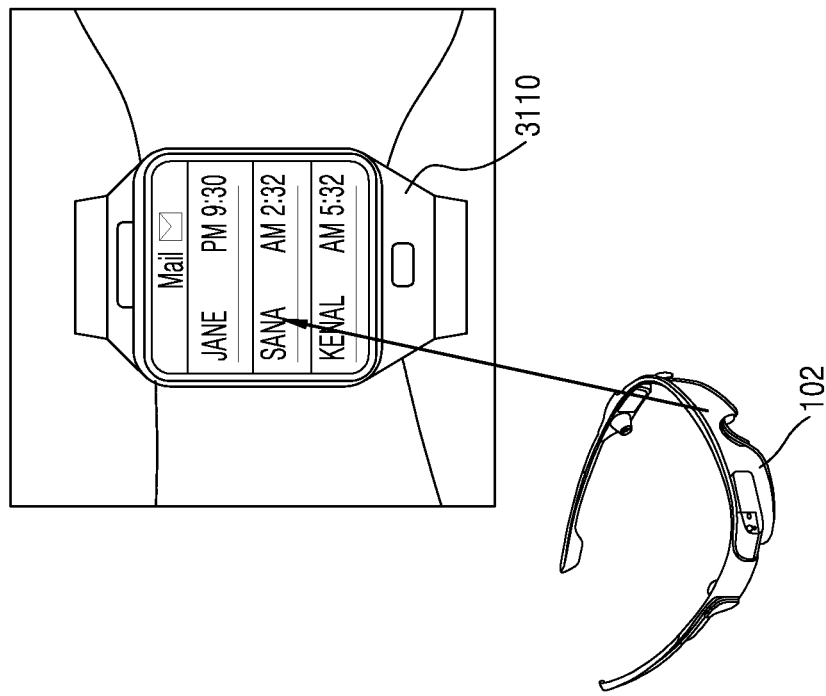

FIGS. 31A and 31B illustrate a use-case scenario illustrating displaying email on an AR device, according to various embodiments of the disclosure.

Referring to FIG. 31A, the screen of a wearable device 3110 is small. When a user is checking email on a wearable device with an eye gaze of the AR device 102 focusing on a screen of the wearable device the user needs to click an email to see the email content.

Referring to FIG. 31B, the system 100 shows the email content with an AR view 3120 without a need to click on the wearable device. Thus, the user may be able to activate displaying the email content by only viewing the email on the wearable device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of providing multi-views with an augmented reality (AR) device, the method comprising:
    establishing a connection with at least one browsing device;
    extracting a URL of AR content included in content source information which is displayed on a physical display of the at least one browsing device, wherein the URL of the AR content is identified by a user's gaze;
    transmitting, by the AR device, the URL of the AR content to a second server to fetch the AR content from the second server; and
    displaying, based on the URL of the AR content, the AR content on an AR plane which is separately viewable from a webpage displayed on the physical display of the at least one browsing device.

2. The method of claim 1, wherein the AR plane is viewable outside the physical display of the at least one browsing device.

3. The method of claim 1, wherein the transmitting of the URL comprises transmitting the content source information and eye gaze information to the second server to fetch the AR content from the second server.

4. The method of claim 3, wherein the eye gaze information is obtained by calculating coordinates of an eye focus point on the physical display of the at least one browsing device.

5. The method of claim 4, wherein the eye gaze information is obtained by further calculating a user focus point coordinates with respect to the AR plane by the AR device.

6. The method of claim 3, wherein the eye gaze information comprises at least one of position information of content displayed on the physical display of the at least one browsing device, or a field of view information of a user.

7. The method of claim 1, wherein the content source information further comprises AR server information including network address information of the second server.

8. The method of claim 1, further comprising:
    tracking an eye gaze of a user of the AR device; and
    determining, based on the eye gaze of the user, at least one web element on the webpage displayed on the physical display of the at least one browsing device,
    wherein the displaying of the AR content comprises displaying the AR content corresponding to the web element on the webpage.

9. The method of claim 1, further comprising:
    tracking an eye gaze of a user of the AR device;
    identifying, based on the eye gaze of the user, at least one visual element on the webpage displayed on the physical display of the at least one browsing device; and
    displaying a webpage by activating at least one of forwarding or backwarding, a scroll bar or a tab on a current webpage in accordance with a type of the at least one visual element on the webpage.

10. The method of claim 9, wherein the displaying of the AR content comprises displaying the AR content corresponding to the webpage on the AR plane.

11. An augmented reality (AR) device for providing multi-views, the AR device comprising:
    a camera; and
    at least one processor configured to:
        establish a connection with at least one browsing device, extracting a URL of AR content included in content source information which is displayed on a physical display of the at least one browsing device, wherein the URL of the AR content is identified by a user's gaze, and transmit, by the AR device, the URL of the AR content to a second server to fetch the AR content corresponding to the URL from the second server, wherein based on the URL of the AR content, the AR content on an AR plane is separately viewable from a webpage displayed on the physical display of the at least one browsing device.

12. The AR device of claim 11, wherein the AR plane is viewable outside the physical display of the at least one browsing device.

13. The AR device of claim 11, wherein the transmitting of the URL of the AR content comprises transmitting the content source information and eye gaze information to the second server to fetch the AR content from the second server.

14. The AR device of claim 13, wherein the eye gaze information is obtained by calculating coordinates of an eye focus point on the physical display of the at least one browsing device.

15. The AR device of claim 14, wherein the eye gaze information is obtained by further calculating a user focus point coordinates with respect to the AR plane by the AR device.

16. The AR device of claim 13, wherein the eye gaze information comprises position information of content displayed on the physical display of the at least one browsing device, a field of view information of a user.

17. The AR device of claim 11, wherein the content source information further comprises AR server information including network address information of the second server.

18. The AR device of claim 11,
wherein the at least one processor is further configured to:
control the camera to track an eye gaze of a user of the AR device, and
determine, based on the eye gaze of the user, at least one web element on the webpage displayed on the physical display of the at least one browsing device, and
wherein the displaying of the AR content comprises displaying the AR content corresponding to the web element on the webpage.

19. The AR device of claim 11,
wherein the at least one processor is further configured to:
control the camera to track an eye gaze of a user of the AR device,
identify, based on the eye gaze of the user, at least one visual element on the webpage displayed on the physical display of the at least one browsing device, and
control the display to display a webpage based on an activation of at least one of forwarding or backwarding, a scroll bar or a tab on a current webpage in accordance with a type of the at least one visual element on the webpage.

20. A non-transitory computer readable medium embodying a computer program for operating an augmented reality (AR) device including a memory and at least one processor, the computer program comprising computer readable program code that, when executed by the at least one processor, causes the AR device to:
establish a connection with at least one browsing device;
extract a URL of AR content included in content source information which is displayed on a physical display of the at least one browsing device, wherein the URL of the AR content is identified by a user's gaze;
transmit, by the AR device, the URL of the AR content to a second server to fetch the AR content from the second server; and
display, based on the URL of the AR content, the AR content on an AR plane which is separately viewable from a webpage displayed on the physical display of the at least one browsing device.

* * * * *